(12) United States Patent
Umino

(10) Patent No.: US 12,249,936 B2
(45) Date of Patent: Mar. 11, 2025

(54) MOTOR CONTROL DEVICE

(71) Applicant: ORIENTAL MOTOR CO., LTD., Tokyo (JP)

(72) Inventor: Hikaru Umino, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 211 days.

(21) Appl. No.: 17/920,330

(22) PCT Filed: Apr. 6, 2021

(86) PCT No.: PCT/JP2021/014630
§ 371 (c)(1),
(2) Date: Oct. 20, 2022

(87) PCT Pub. No.: WO2021/225054
PCT Pub. Date: Nov. 11, 2021

(65) Prior Publication Data
US 2023/0170832 A1    Jun. 1, 2023

(30) Foreign Application Priority Data

May 8, 2020    (JP) .................................. 2020-082561

(51) Int. Cl.
*H02P 25/098*    (2016.01)
*H02P 8/12*    (2006.01)
(Continued)

(52) U.S. Cl.
CPC .............. *H02P 25/098* (2016.02); *H02P 8/12* (2013.01); *H02P 8/18* (2013.01); *H02P 27/08* (2013.01)

(58) Field of Classification Search
CPC .. H02P 25/098; H02P 8/12; H02P 8/18; H02P 27/08
(Continued)

(56) References Cited

U.S. PATENT DOCUMENTS

2009/0026997 A1*  1/2009  Satake .................... H02P 25/08
                                                        318/701
2013/0099707 A1    4/2013  Okubo

FOREIGN PATENT DOCUMENTS

CN    104868800 A    8/2015
CN    109450303 A    3/2019
(Continued)

OTHER PUBLICATIONS

Hidetaka Takemura, et al., "Vibration Suppression of Stepping Motor Driven System Using Cogging Torque Compensator", Transactions of the Japan Society of Mechanical Engineers Series C, vol. 78, No. 785 (Jan. 2012), pp. 74-81; English abstract.

*Primary Examiner* — Kawing Chan
(74) *Attorney, Agent, or Firm* — Rabin & Berdo, P.C.

(57) ABSTRACT

A motor control device is provided, which drives a two-phase synchronous motor. The motor control device includes: control current waveform generating means which generates a control current waveform by superposing a fundamental sinusoidal wave and a reluctance torque correction waveform that suppresses the fluctuation of the reluctance torque of the two-phase synchronous motor; and current control signal generating means which generates a current control signal for supplying a current to the windings of the two-phase synchronous motor according to the control current waveform generated by the control current waveform generating means. The reluctance torque correction waveform may have a waveform profile such that an original waveform having a frequency twice that of the fundamental sinusoidal wave and having a phase matched with that of the fundamental sinusoidal wave is full-wave-rectified to the same sign as or a different sign from that of the fundamental sinusoidal wave.

14 Claims, 31 Drawing Sheets

(51) Int. Cl.
*H02P 8/18* (2006.01)
*H02P 27/08* (2006.01)

(58) Field of Classification Search
USPC .......................................................... 318/701
See application file for complete search history.

(56) References Cited

FOREIGN PATENT DOCUMENTS

| | | | |
|---|---|---|---|
| EP | 2919378 A1 | | 9/2015 |
| JP | H03-169297 A | | 7/1991 |
| JP | 2003-009592 A | | 1/2003 |
| JP | 2008278643 A | * | 11/2008 |
| JP | 2019-516339 A | | 6/2019 |
| TW | 201424247 A | | 6/2014 |

* cited by examiner

When θ = 0 degree (at stable point)

When θ = 1.8 degrees (Maximum torque)

Slot magnet type motor with gap ratio of 4 in non-excitation

Slot magnet type motor with gap ratio of 4 in d-axis excitation with rated current according to rotor angle Slot magnet type motor with gap ratio of 4 in non-excitation Slot magnet type motor with gap ratio of 4 in d-axis excitation with rated current according to rotor angle Slot magnet type motor with gap ratio of 8 in non-excitation Slot magnet type motor with gap ratio of 8 in d-axis excitation with rated current according to rotor angle FIG. 27 Reluctance torque of slot magnet type motor with gap ratio of 8 in d-axis excitation FIG. 31A  Stop angle error in full-step driving with 100% current at stop
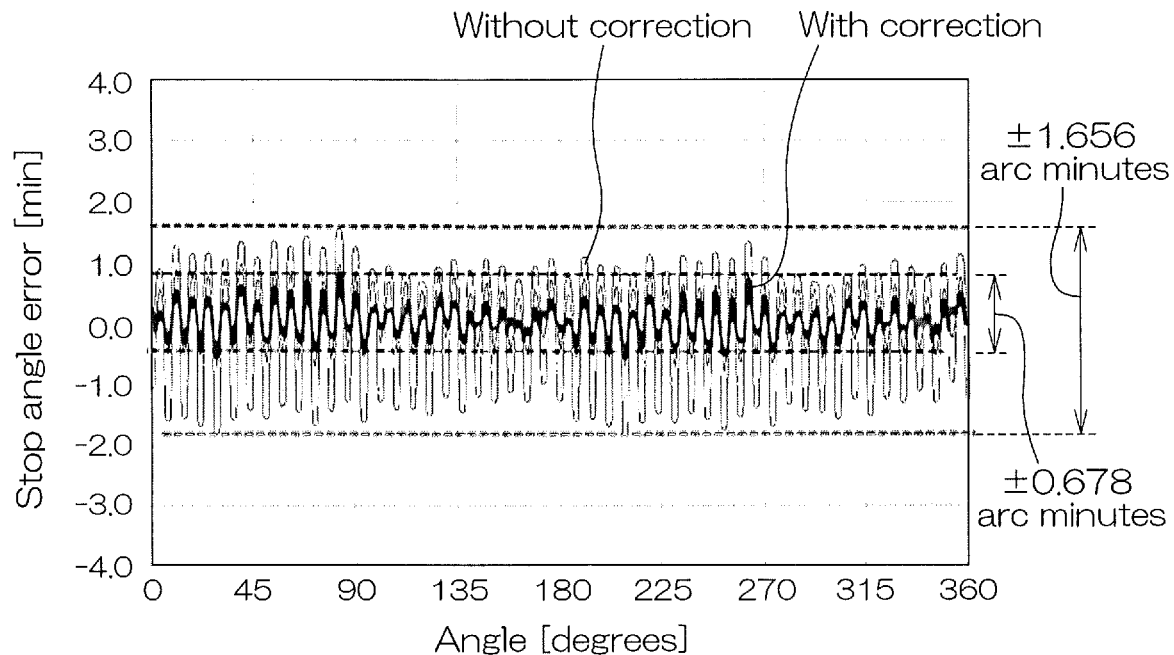
FIG. 31B  Stop angle error in full-step driving with 50% current at stop
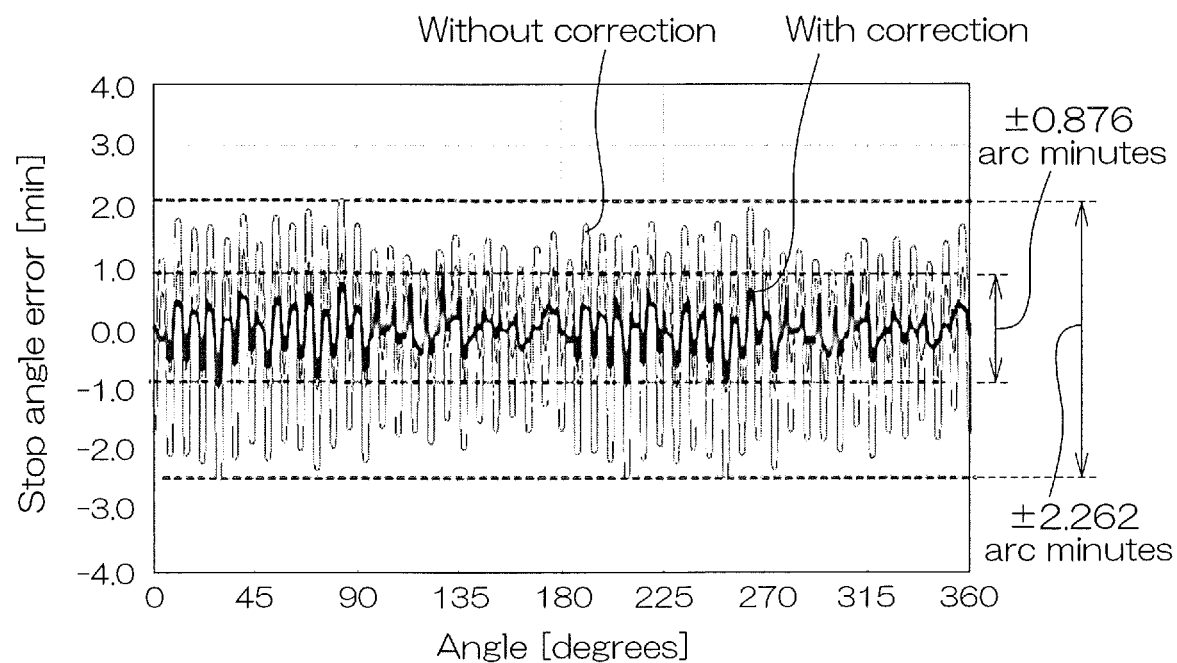

MOTOR CONTROL DEVICE

TECHNICAL FIELD

The present invention relates to a motor control device for driving a two-phase synchronous motor.

BACKGROUND ART

A typical example of the two-phase synchronous motor is a two-phase stepping motor.

When the two-phase stepping motor is driven with a sinusoidal current, rotational vibrations are liable to occur under certain conditions. Specifically, the eigenfrequency of the motor is determined by the sum of a rotor inertia and a load inertia, and a torque generated by the motor. The rotational vibrations occur when the rotation speed of the motor is such that the sinusoidal current frequency for the motor driving is one half or one fourth the eigenfrequency.

Further, the stepping motor suffers from a phenomenon such that, when the motor is stopped by excitation of windings with a constant current, the stop position is deviated from a theoretical stop position. This is referred to as "stop angle error."

The problems of the rotational vibrations and the stop angle error are remarkable in a hybrid type stepping motor, particularly in a small-scale hybrid type stepping motor. In a slot magnet type stepping motor which includes magnets inserted between its stator small teeth and/or between its rotor small teeth, the problems of the rotational vibrations and the stop angle error are also remarkable.

PTL 1 discloses a method for suppressing the vibrations by generating an excitation current through micro-step driving with triangular pulses and changing a third harmonic component and a fifth harmonic component obtained by the Fourier transformation of the triangular pulses.

PTL 2 points out that the vibrations occur due to harmonic components of the counter electromotive force of the motor, and discloses a method for suppressing the harmonic components of the counter electromotive force by excitation phase compensation.

NPL 1 points out that the motor vibrations occur due to a cogging torque, and discloses a method for suppressing the cogging torque by excitation phase compensation.

CITATION LIST

Patent Literature

PTL 1: JP2003-9592A
PTL 2: JP2019-516339A

NONPATENT LITERATURE

NPL 1: Hidetaka TAKEMURA, et al., Vibration Suppression of Stepping Motor Driven System Using Cogging Torque Compensator, Transactions of the Japan Society of Mechanical Engineers Series C, Vol. 78, No. 785 (2012-1), p. 74-81

SUMMARY OF INVENTION

Problem to be Solved by Invention

An embodiment of the present invention provides a novel motor control device capable of suppressing the vibrations of the two-phase synchronous motor based on a viewpoint different from the conventional arts described above.

Another embodiment of the present invention provides a motor control device capable of reducing the stop angle error of the two-phase synchronous motor.

Solution to Problem

According to one embodiment of the present invention, there is provided a motor control device for driving a two-phase synchronous motor. The motor control device includes control current waveform generating means which generates a control current waveform by superposing a fundamental sinusoidal wave and a reluctance torque correction waveform that suppresses the fluctuation of the reluctance torque of the two-phase synchronous motor. The motor control device further includes current control signal generating means which generates a current control signal for supplying a current to the windings of the two-phase synchronous motor according to the control current waveform generated by the control current waveform generating means.

With this arrangement, the reluctance torque correction waveform that suppresses the fluctuation of the reluctance torque is superposed on the fundamental sinusoidal wave to generate the control current waveform, and the two-phase synchronous motor is driven according to the control current waveform. This makes it possible to suppress the vibrations attributable to the fluctuation of the reluctance torque.

The inventor of the present invention found that the rotational vibrations and the stop angle error of the two-phase synchronous motor are attributable to the fluctuation of the rotor angle-dependent waveform of the torque ($\theta$-T waveform) caused with respect to the excitation phases depending on the motor current value, and attained the present invention. Particularly, the inventor found that the sum of reluctance torques which has been considered ignorable in conventional theories related to the stepping motor affects the fluctuation of the $\theta$-T waveform. In the embodiment of the present invention, therefore, the rotational vibrations can be suppressed and the stop angle error can be reduced by using the control current waveform generated by superposing the reluctance torque correction waveform that suppresses the fluctuation of the reluctance torque (more precisely, the excitation phase-dependent fluctuation) on the fundamental sinusoidal wave. That is, the control current waveform is such that the fluctuation of the reluctance torque waveform ($\theta$-T waveform) with respect to the excitation phases is suppressed or prevented. With the use of the control current waveform, the motor of the type in which the reluctance torque is not ignorable can be smoothly driven on an open loop basis with suppressed vibrations.

The motor control device may be configured so as to drive the two-phase synchronous motor by an open-loop constant current control. The open-loop control may be such that neither position feedback nor speed feedback is involved.

In an embodiment of the present invention, the reluctance torque correction waveform has a waveform profile such that an original waveform having a frequency twice that of the fundamental sinusoidal wave and having a phase matched with that of the fundamental sinusoidal wave is full-wave-rectified to the same sign as or a different sign from that of the fundamental sinusoidal wave. The phase matching does not necessarily mean strict phase matching. Of course, the phase matching may be the strict phase matching but, in reality, the vibration suppressing effect is often improved by intentionally introducing a slight phase shift. Therefore, the phase matching herein means that the phase shift is permitted as long as the excitation phase-dependent fluctuation of the reluctance torque can be suppressed.

In an embodiment of the present invention, the original waveform is a sinusoidal waveform.

In an embodiment of the present invention, the reluctance torque correction waveform has a waveform profile such that the original waveform is full-wave-rectified to the same sign as that of the fundamental sinusoidal wave when the amplitude of an angle-differentiated self-inductance of the two-phase synchronous motor is greater than the amplitude of an angle-differentiated mutual inductance of the two-phase synchronous motor, and the reluctance torque correction waveform has a waveform profile such that the original waveform is full-wave-rectified to the different sign from that of the fundamental sinusoidal wave when the amplitude of the angle-differentiated self-inductance of the two-phase synchronous motor is smaller than the amplitude of the angle-differentiated mutual inductance of the two-phase synchronous motor.

In an embodiment of the present invention, the reluctance torque correction waveform is a waveform generated by calculation using a ratio between the amplitude of the angle-differentiated self-inductance and the amplitude of the angle-differentiated mutual inductance of the two-phase synchronous motor.

In an embodiment of the present invention, the reluctance torque correction waveform is a waveform which varies according to a motor current supplied to the two-phase synchronous motor.

In an embodiment of the present invention, the two-phase synchronous motor is a stepping motor. The stepping motor may be of a hybrid type or may be of a slot magnet type.

In an embodiment of the present invention, the control current waveform has a waveform profile generated superposing the fundamental sinusoidal wave, by the reluctance torque correction waveform, and a magnet torque correction waveform for compensation for the nonlinearity of a magnet torque with respect to the current.

The nonlinearity of the magnet torque with respect to the current can cause the rotational vibrations of the motor. Therefore, the waveform generated by further superposing the magnet torque correction waveform is used as the control current waveform, thereby further suppressing the rotational vibrations and the stop angle error of the motor. The current correction for the nonlinearity of the magnet torque is particularly effective for the hybrid type stepping motor.

In an embodiment of the present invention, the magnet torque correction waveform is a waveform which varies according to the motor current supplied to the two-phase synchronous motor.

In an embodiment of the present invention, the magnet torque correction waveform has a waveform profile that amplifies the amplitude of a peak portion of the fundamental sinusoidal wave when being superposed on the fundamental sinusoidal wave.

The foregoing and other objects, features, and effects of the present invention will become more apparent from the following description of embodiments with reference to the attached drawings.

BRIEF DESCRIPTION OF DRAWINGS

FIGS. 31A and 31B are diagrams showing the results of the measurement of the stop angle error when the slot magnet type stepping motor was operated by full-step driving.

DESCRIPTION OF EMBODIMENTS

Figure 1:
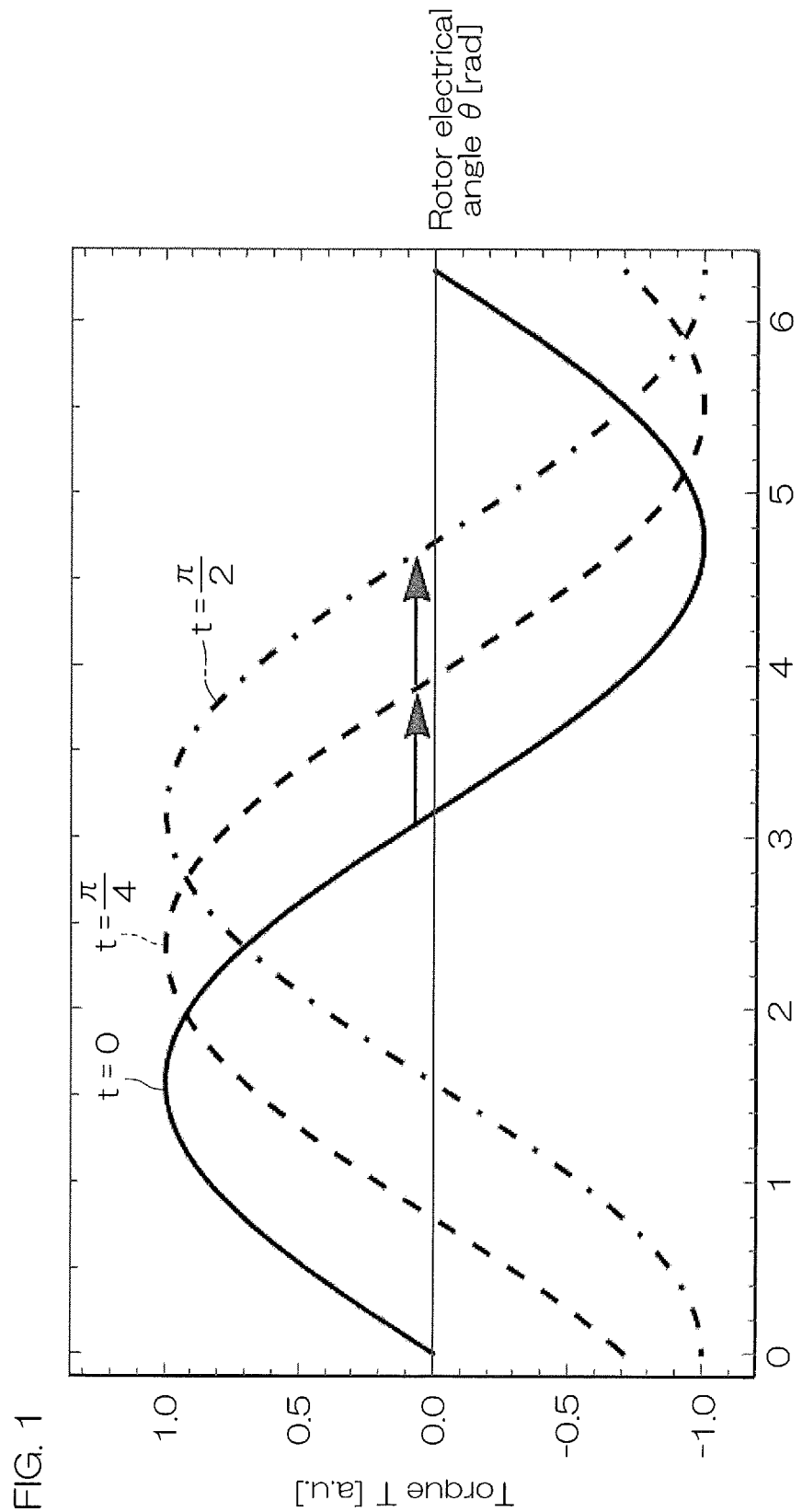
FIG. 1 is a waveform diagram showing a θ-T waveform of an ideal magnet torque.

The inventor of the present invention found that the rotor angle dependence (θ-T characteristic) of the torque fluctuates with respect to an excitation phase depending on a motor current value, and this accounts for why the rotational vibrations and/or the stop angle error are exacerbated. Particularly, the inventor found that the nonlinearity of the current value with respect to the generation torque affects the fluctuation of the θ-T waveform indicating the relationship between the rotor angle and the torque, and the reluctance torque which has been considered ignorable in the conventional theories related to the stepping motor also affects the fluctuation of the θ-T waveform. Based on these findings, the present application provides the following embodiment.

In this embodiment, specifically, a current waveform is applied such as to prevent the fluctuation of the reluctance torque waveform with respect to the excitation phase, thereby suppressing the rotational vibrations and/or the stop angle error. Where the motor of the type in which the reluctance torque is not ignorable is driven on an open loop basis, this arrangement ensures smooth driving without the vibrations.

[Consideration of Magnet Torque in Ideal Cases]

In synchronous motors in which the motor inductance is less angle-dependent, e.g., in surface magnet type motors, hybrid type stepping motors and some of embedded magnet type motors, the motor torque is dominantly generated by magnets. The torque generated by the magnets is referred to as "magnet torque."

In the case of a two-phase motor, the magnet torque $T_M$ can be represented by the resultant of A-phase and B-phase θ-T waveforms. The A-phase θ-T waveform can be represented by a product $I_A \cdot \sin(\theta)$ of an A-phase current $I_A$ and a function $\sin(\theta)$ of a rotor position (specifically, a rotor angle θ), and the B-phase θ-T waveform can be represented by a product $I_B \cdot \cos(\theta)$ of a B-phase current $I_B$ and a function $\cos(\theta)$ of the rotor position. Therefore, the magnet torque $T_M$ is the sum of $I_A \cdot \sin(\theta)$ and $I_B \cdot \cos(\theta)$ as can be represented by the following expression (1). It is herein assumed that the torque constant is 1.

$$T_M = I_A \cdot \sin(\theta) + I_B \cdot \cos(\theta) \tag{1}$$

In the case of the stepping motor, it is known that relationships between the magnet torque and the currents are not linear. Therefore, second-order terms of the currents are introduced into the expression (1) with their coefficients each defined as p, whereby the following expression (2) is provided. The ideal magnet torque is represented by the above expression (1) with p=0.

$$T_M = I_A(1-pI_A^2)\sin(\theta) + I_B(1-pI_B^2)\cos(\theta) \tag{2}$$

Here, consideration is given to the ideal magnet torque, i.e., with p=0. It is herein assumed that the currents each vary in an ideal sinusoidal waveform of an angular speed ω with time, and are respectively represented by $I_A(t)=\cos(\omega t)$ and $I_B(t)=-\sin(\omega t)$ (wherein t is time). Then, the above expression (2) is converted as follows:

$$T_M(t, \theta) = \cos(\omega t)\sin(\theta) - \sin(\omega t)\cos(\theta) = -\sin(\omega t - \theta) \tag{3}$$

In this case, θ-T waveforms are shown in FIG. 1. Specifically, θ-T waveforms observed when ω=1 and t=0, π/4, π/2 are shown.

FIG. 1 indicates that a θ-T waveform is moved parallel as it is, and is free from torque pulsation with a certain load. Therefore, a rotational vibrating force attributable to the torque pulsation does not act, so that the motor is free from the rotational vibrations.

[Consideration of Reluctance Torque]

Even without the provision of the magnets, electromagnetic forces occur between iron cores due to magnetic fluxes generated by coils. A torque is generated by attraction with the electromagnetic forces. This is referred to as "reluctance torque." The reluctance torque is attributable to the θ-dependence of the motor inductance. With the sum of magnetic energies defined as U, with A-phase and B-phase self-inductances defined as $L_A$ and $L_B$, respectively, and with a mutual inductance defined as M, the reluctance torque $T_r$ can be represented by the following expression:

$$T_r(t, \theta) = \frac{\partial U}{\partial \theta} \tag{4}$$

$$= -\frac{\partial}{\partial \theta}\left(\frac{1}{2}I_A(t)^2 L_A(\theta) + \frac{1}{2}I_B(t)^2 L_B(\theta) + I_A(t)I_B(t)M(\theta)\right)$$

$$= -\left(\frac{1}{2}I_A^2\frac{dL_A}{d\theta} + \frac{1}{2}I_B^2\frac{dL_B}{d\theta} + I_AI_B\frac{dM}{d\theta}\right)$$

A hybrid type stepping motor, for example, includes a rotor having a plurality of small teeth (rotor small teeth) circumferentially provided equidistantly at constant small tooth pitch, and a stator disposed in opposed relation to the rotor. More specifically, the rotor includes two rotor segments offset from each other by half the small tooth pitch about a rotation shaft and fixed to the rotation shaft. One of the rotor segments is magnetized to S-polarity, while the other rotor segment is magnetized to N-polarity. A plurality of small teeth (e.g., 50 small teeth) are equidistantly disposed at the constant small tooth pitch circumferentially of each of the rotor segments. The stator includes a plurality of main poles each having a plurality of small teeth (stator small teeth) disposed at the same small tooth pitch as the rotor.

The two-phase stepping motor has A-phase, B-phase having a 90-degree phase shift with respect to the A-phase, /A-phase having a 180-degree phase shift with respect to the A-phase, and/B-phase having a 180-degree phase shift with respect to the B-phase. The stator has a plurality of main poles respectively having windings to which A-phase current, B-phase current, /A-phase current and/B-phase current are respectively applied, and each including stator teeth provided thereon in opposed relation to the rotor. When the stator teeth on the A-phase main pole are opposed to rotor teeth, the stator teeth on the B-phase main pole are offset from rotor teeth by a ¼ pitch (an electrical angle of 90 degrees), and the stator teeth on the/A-phase main pole are offset from rotor teeth by a ⅔ pitch (an electrical angle of 180 degrees). Further, the stator teeth on the/B-phase main pole are offset from rotor teeth by a ¾ pitch (an electrical angle of 270 degrees).

Figure 2:
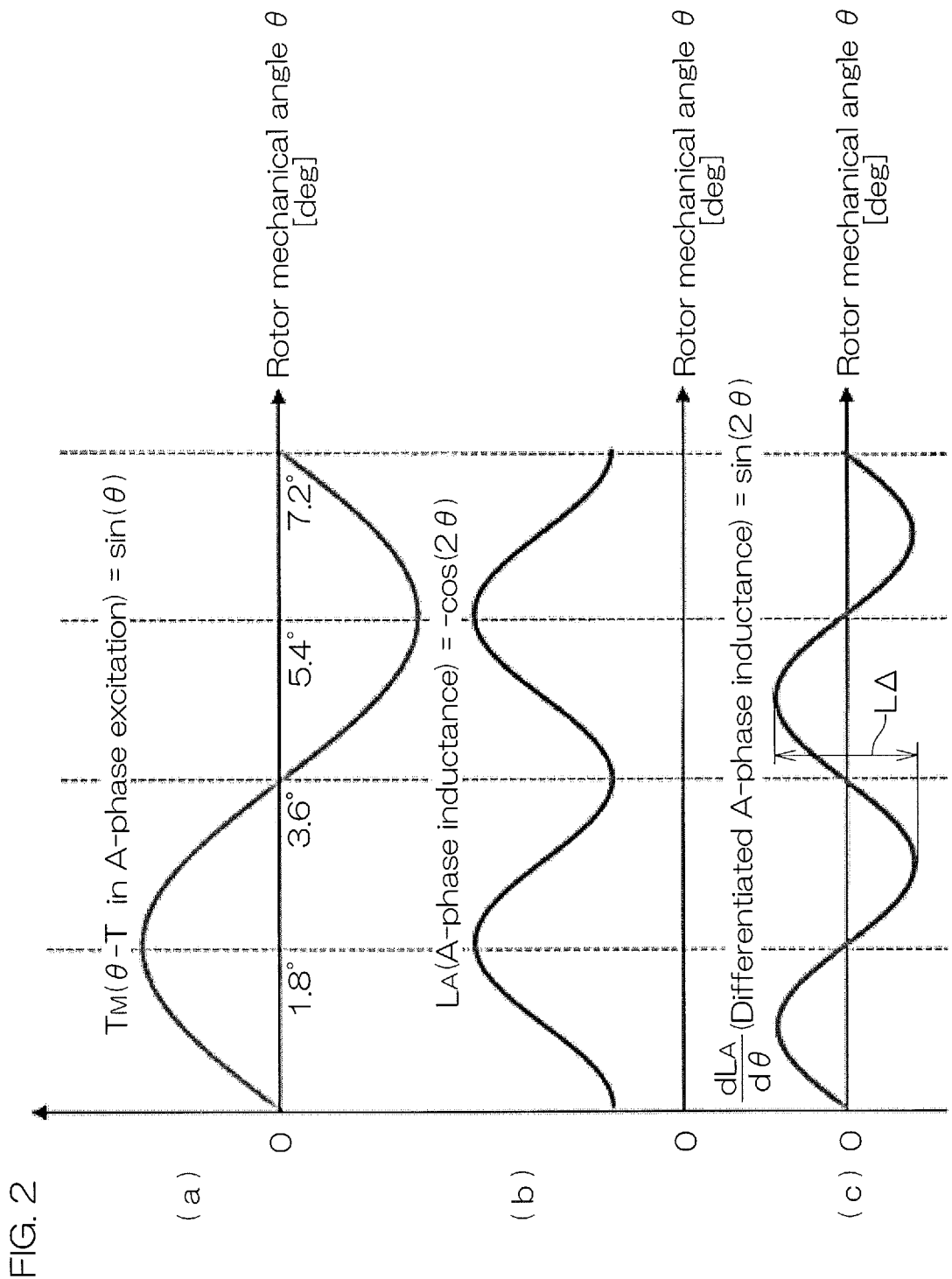
FIG. 2 is waveform diagrams showing relationships of a magnet torque, an inductance, and an angle-differentiated inductance with respect to a rotor angle.
Figure 3A:
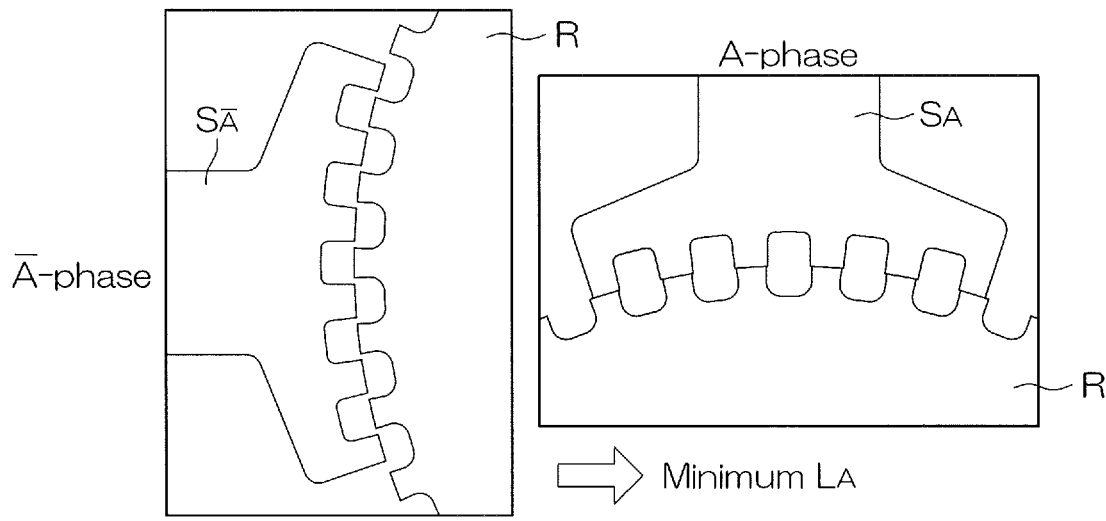
FIGS. 3A and 3B are diagrams for describing relationships between the state of the stepping motor and a self-inductance.
Figure 3B:
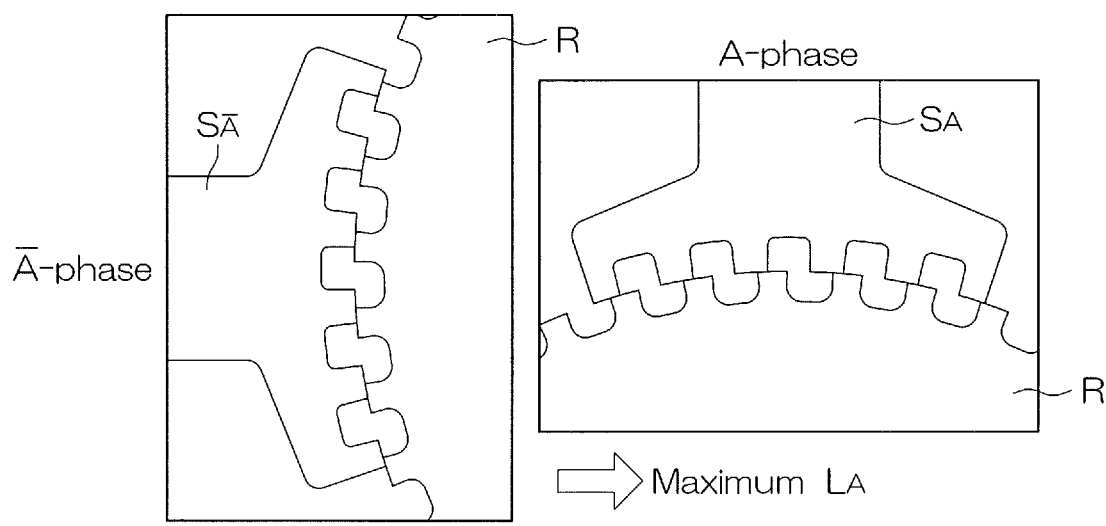

It is herein assumed that the A-phase is excited to the N-polarity and the/A-phase is excited to the S-polarity. At this time, the magnet torque $T_M$ can be represented by the sinusoidal function of the rotor angle θ as shown in FIG. 2(a). As shown in FIG. 3A, the small teeth of the A-phase stator main pole SA are opposed to the small teeth of the rotor R (more specifically, the S-polarity rotor segment) at an excitation stable point (at an electrical angle of 0 degree) and, in this state, the small teeth of the/A-phase stator main pole S/A are offset from the small teeth of the rotor R (more specifically, the S-polarity rotor segment) by a ½ pitch (by an electrical angle of 180 degrees). At this time, the A-phase self-inductance $L_A$ is minimum. The rotor R is rotated by an electrical angle of 90 degrees (where the number of the rotor teeth is 50, by a mechanical angle of 1.8 degrees) from this state and, when a state shown in FIG. 3B is reached, the magnet torque IM is maximized. At this time, the A-phase self-inductance $L_A$ is maximum. Therefore, it can be assumed that the phase of the A-phase self-inductance $L_A$ is as shown in FIG. 2 (b). That is, the A-phase self-inductance $L_A$ fluctuates sinusoidally at a frequency twice that of the sinusoidal waveform of the magnet torque $T_M$. Then, it can be assumed that the phase of the angle-differentiated value $dL_A/d\theta$ of the A-phase self-inductance $L_A$ is as shown in FIG. 2 (c). That is, it can be assumed that the angle-differentiated value $dL_A/d\theta$ of the A-phase self-inductance $L_A$ fluctuates sinusoidally at a frequency twice that of the sinusoidal waveform of the magnet torque $T_M$. By giving the same consideration to the B-phase self-inductance $L_B$ and the mutual inductance M, a relationship represented by the following expression can be derived:

$$\frac{dL_A}{d\theta} \propto \sin(2\theta), \frac{dL_B}{d\theta} \propto -\sin(2\theta), \frac{dM}{d\theta} \propto \cos(2\theta) \quad (5)$$

Where the amplitudes of the angle-differentiated values $\{dL_A/d\theta, dL_B/d\theta\}$ of the self-inductances $L_A$, $L_B$ are each defined as LΔ and the amplitude of the angle-differentiated value $\{dM/d\theta\}$ of the mutual inductance M is defined as MΔ, the reluctance torque $T_r(t, \theta)$ can be represented by the following expression:

$$T_r(t, \theta) = \frac{L_\Delta}{2}(I_A^2 - I_B^2)\sin(2\theta) + M_\Delta I_A I_B \cos(2\theta) \quad (6)$$

Figure 4A:
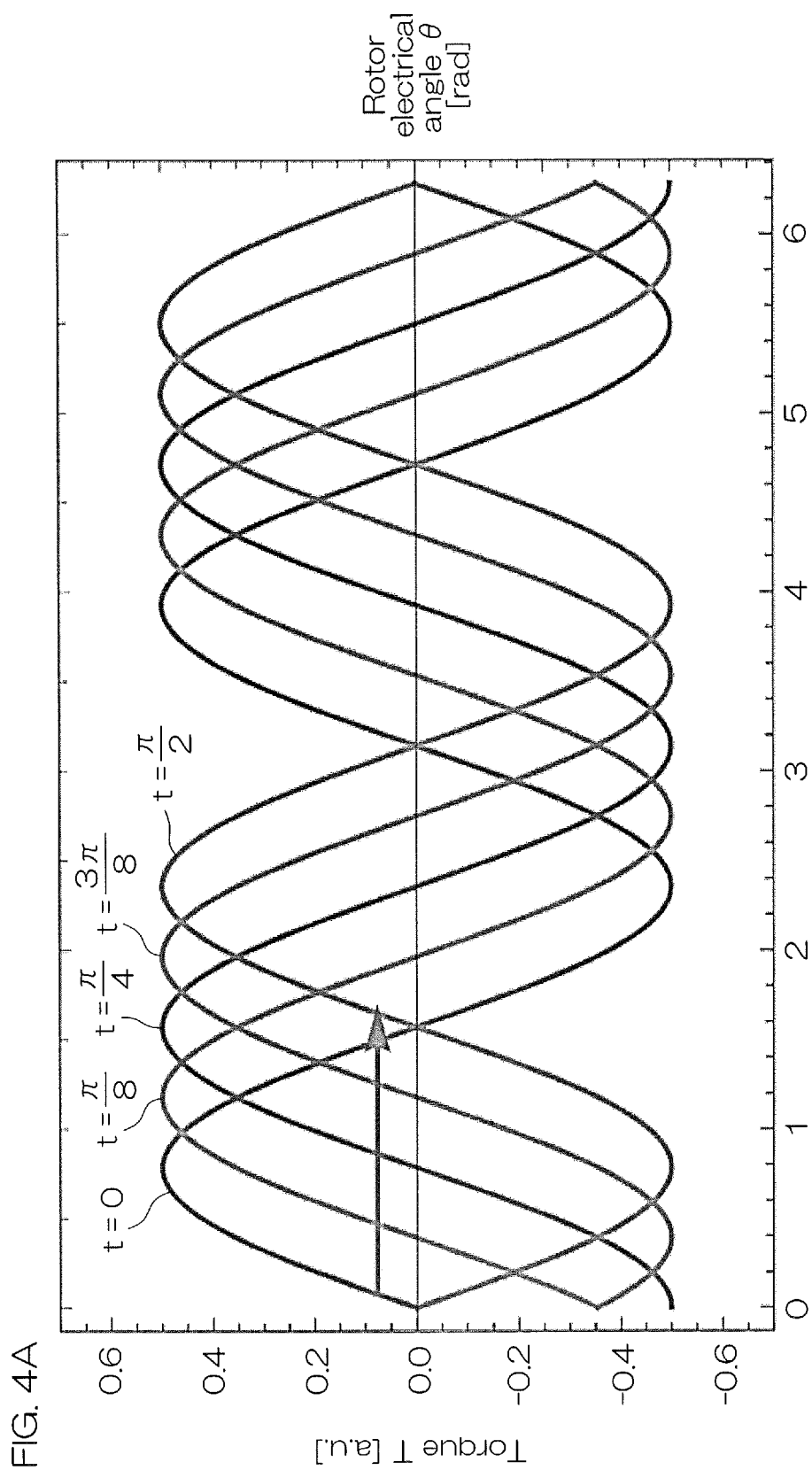
FIG. 4A is a waveform diagram showing θ-T waveforms of a reluctance torque when the amplitude of an angle-differentiated self-inductance is equal to the amplitude of an angle-differentiated mutual inductance.

When MΔ=LΔ, the reluctance torque $T_r$ for an ideal sinusoidal current waveform is as shown in FIG. 4A. In FIG. 4A, θ-T waveforms of the reluctance torque $T_r$ at t=0, π/8, π/4, 3π/8 and π/2 are shown. As shown, the θ-T waveform is moved at the same speed in the same direction as the waveform of the magnet torque $T_M$ while maintaining its waveform profile. Therefore, if the motor can be rotated with the ideal sinusoidal current waveform when MΔ=LΔ, the total torque waveform of the magnet torque $T_M$ and the reluctance torque $T_r$ is invariable with time, and the parallel movement speed of the waveform is constant (specifically, if ω is constant, the parallel movement speed is constant). Therefore, the motor is free from vibrational behavior.

Figure 4B:
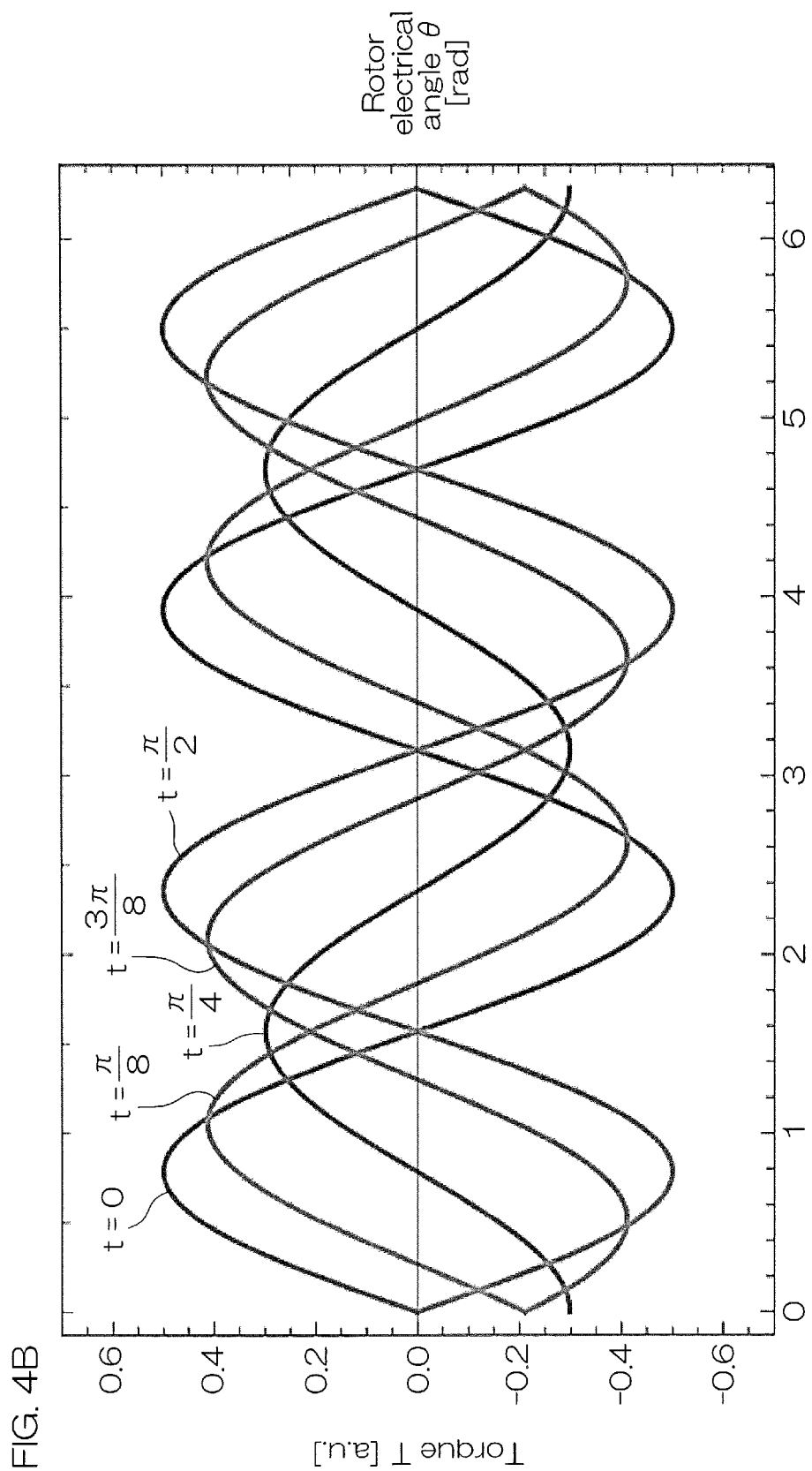
FIG. 4B is a waveform diagram showing θ-T waveforms of the reluctance torque when the amplitude of the angle-differentiated self-inductance is not equal to the amplitude of the angle-differentiated mutual inductance.

When MΔ=LΔ/2, on the other hand, the reluctance torque $T_r$ for the ideal sinusoidal current waveform is as shown in FIG. 4B. In FIG. 4B, θ-T waveforms of the reluctance torque $T_r$ at t=0, π/8, π/4, 3π/8 and π/2 are shown. As shown, the reluctance torque $T_r$ fluctuates with time. Since the total torque also correspondingly fluctuates with time, a vibrating force occurs. In addition, as shown in FIG. 4B, zero-torque points are present at nonequal intervals in the θ-T waveforms at t=0, π/8, π/4, 3π/8 and π/2 defined at an equal time interval. This implies that the vibrating force may occur even with no load, and the vibrations may correspondingly occur.

Therefore, the motor currents are determined such that the θ-T waveform of the reluctance torque $T_r$ is invariable in profile with time for given values of the amplitude parameters LΔ, MΔ. For this, the reluctance torque $T_r$ is not represented by a two-variable function $T_r(t, \theta)$ of t and θ, but is desirably represented by a single-variable function $T_r$ (ωt-θ) of (ωt-θ), like the magnet torque $T_M$. That is, the reluctance torque $T_r$ is desirably represented by $T_r(t, \theta) = T_r$(ωt-θ). This indicates that a waveform at a given time t is such that a waveform observed at a time t=0 is moved as it is by ωt. An advection equation is known as a differential equation giving such a solution. This is employed to provide the following expression:

$$Tr(t, \theta) = Tr(\omega t - \theta) \Rightarrow \frac{\partial Tr}{\partial t} + \omega\frac{\partial Tr}{\partial \theta} = 0 \quad (7)$$

The above expression (6) is put in the left side of the expression (7), thereby providing the following expression:

$$\Rightarrow \frac{\partial Tr}{\partial t} + \omega\frac{\partial Tr}{\partial \theta} = \{\omega L_\Delta(I_A^2 - I_B^2) + M_\Delta(\dot{I}_A I_B + I_A \dot{I}_B)\}\cos(2\theta) + \quad (8)$$
$$\{L_\Delta(\dot{I}_A I_A - I_B \dot{I}_B) - 2\omega M_\Delta(I_A I_B)\}\sin(2\theta)$$

Since this is required to be zero with a given θ, the following expressions are provided:

$$\{\omega L_\Delta(I_A^2 - I_B^2) + M_\Delta(\dot{I}_A I_B + I_A \dot{I}_B) = 0 \quad (9)$$

$$\{L_\Delta(\dot{I}_A I_A - I_B \dot{I}_B) - 2\omega M_\Delta(I_A I_B) = 0 \quad (10)$$

Thereby, the following expressions are provided:

$$\omega L_\Delta(I_A^2 - I_B^2) + M_\Delta \frac{d}{dt}(I_A I_B) = 0 \quad (11)$$

$$\frac{L_\Delta}{2}\frac{d}{dt}(I_A^2 - I_B^2) - 2\omega M_\Delta(I_A I_B) = 0 \quad (12)$$

These are combined together to provide the following simultaneous equations:

$$\frac{d^2}{dt^2}(I_A I_B) = -4\omega^2 I_A I_B \quad (13)$$

$$\frac{d^2}{dt^2}(I_A^2 - I_B^2) = -4\omega^2(I_A^2 - I_B^2) \quad (14)$$

These are solved as follows, wherein $A_1$, $A_2$, $\delta_1$ and $\delta_2$ are constants.

$$I_A I_B = A_1 \cos(2\omega t + \delta_1) \quad (15)$$

$$I_A^2 - I_B^2 = A_2 \cos(2\omega t + \delta_2) \quad (16)$$

These are solved for $I_A$, thereby providing the following expression:

$$I_A^4 - I_A^2 A_2 \cos(2\omega t + \delta_2) - A_1^2 \cos^2(2\omega t + \delta_1) = 0 \Rightarrow I_A = \quad (17)$$

$$\pm \frac{1}{\sqrt{2}} \sqrt{A_2 \cos(2\omega t + \delta_2) \pm \sqrt{A_2^2 \cos^2(2\omega t + \delta_2) + 4A_1^2 \cos^2(2\omega t + \delta_1)}}$$

Similarly, these are solved for $I_B$, thereby providing the following expression:

$$I_B^4 + I_B^2 A_2 \cos(2\omega t + \delta_2) - A_1^2 \cos^2(2\omega t + \delta_1) = 0 \Rightarrow I_B = \quad (18)$$

$$\pm \frac{1}{\sqrt{2}} \sqrt{-A_2 \cos(2\omega t + \delta_2) \pm \sqrt{A_2^2 \cos^2(2\omega t + \delta_2) + 4A_1^2 \cos^2(2\omega t + \delta_1)}}$$

$I_A$ and $I_B$ in the expressions (17) and (18) are put in the expression (6) for the determination of the reluctance torque $T_r$, and undetermined coefficients are determined so as to satisfy $T_r = -\alpha \sin(2(\omega t - \theta))$. Then, the following expression is provided:

$$T_r(t, \theta) = \frac{L_\Delta}{2}(A_2 \cos(2\omega t + \delta_2))\sin(2\theta) + M_\Delta(A_1 \cos(2\omega t + \delta_1))\cos(2\theta) = \quad (19)$$

$$-\alpha \sin(2(\omega t - \theta)) \Rightarrow A_1 = -\frac{\alpha}{M_\Delta},\ A_2 = \frac{2\alpha}{L_\Delta},\ \delta_1 = -\frac{\pi}{2},\ \delta_2 = 0$$

This is put in the expressions (17) and (18), whereby the A-phase current $I_A$ and the B-phase current $I_B$ are determined as follows:

$$I_A = \pm \sqrt{\frac{\alpha}{L_\Delta}} \sqrt{\cos(2\omega t) \pm \sqrt{\cos^2(2\omega t) + \left(\frac{L_\Delta}{M_\Delta}\right)^2 \sin^2(2\omega t)}} \quad (20)$$

$$I_B = \pm \sqrt{\frac{\alpha}{L_\Delta}} \sqrt{-\cos(2\omega t) \pm \sqrt{\cos^2(2\omega t) + \left(\frac{L_\Delta}{M_\Delta}\right)^2 \sin^2(2\omega t)}} \quad (21)$$

Values in the roots need to be constantly positive because $I_A$ and $I_B$ are real numbers, and net currents in each current cycle need to be zero. Therefore, solutions which satisfy these conditions are as follows:

(22)

$$I_A(t) = \begin{cases} \sqrt{\frac{\alpha}{L_\Delta}} \sqrt{\cos(2\omega t) + \sqrt{\cos^2(2\omega t) + \left(\frac{L_\Delta}{M_\Delta}\right)^2 \sin^2(2\omega t)}} & \left(0 < \omega t \le \frac{\pi}{2} \text{ or } \frac{3\pi}{2} < \omega t \le 2\pi\right) \\ -\sqrt{\frac{\alpha}{L_\Delta}} \sqrt{\cos(2\omega t) + \sqrt{\cos^2(2\omega t) + \left(\frac{L_\Delta}{M_\Delta}\right)^2 \sin^2(2\omega t)}} & \left(\frac{\pi}{2} < \omega t < \frac{3\pi}{2}\right) \end{cases}$$

$$I_B(t) = \begin{cases} -\sqrt{\frac{\alpha}{L_\Delta}} \sqrt{-\cos(2\omega t) + \sqrt{\cos^2(2\omega t) + \left(\frac{L_\Delta}{M_\Delta}\right)^2 \sin^2(2\omega t)}} & (0 < \omega t \le \pi) \\ \sqrt{\frac{\alpha}{L_\Delta}} \sqrt{-\cos(2\omega t) + \sqrt{\cos^2(2\omega t) + \left(\frac{L_\Delta}{M_\Delta}\right)^2 \sin^2(2\omega t)}} & (\pi < \omega t < 2\pi) \end{cases} \quad (23)$$

Figure 5A:
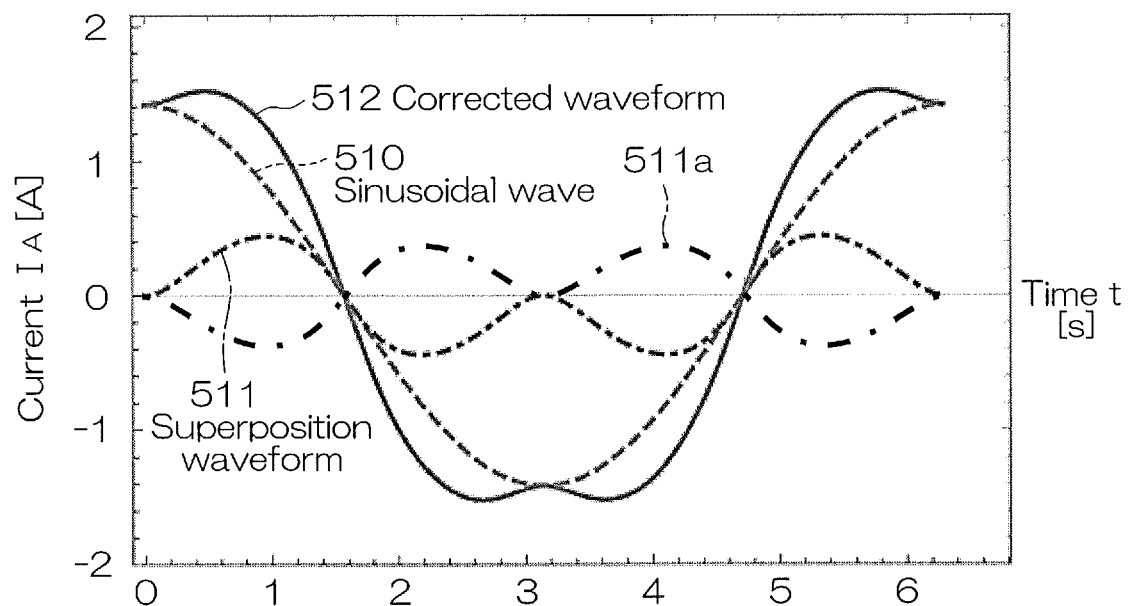
FIGS. 5A and 5B are waveform diagrams for describing current waveforms for suppressing the fluctuation of the θ-T waveform of the reluctance torque according to the excitation phase.
Figure 5B:
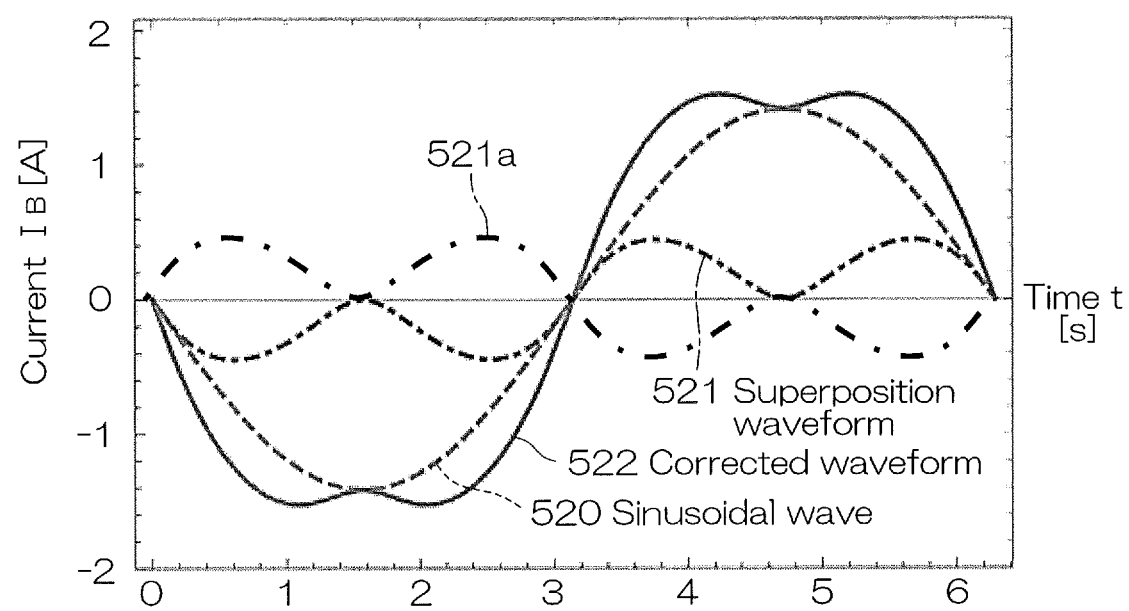

The waveforms of the A-phase current $I_A$ and the B-phase current $I_B$ when $M\Delta = L\Delta/2$ are respectively shown by a line 512 in FIG. 5A and by a line 522 in FIG. 5B. It is herein assumed that $\omega = 1$ and $L\Delta = 1$. In the above expressions (22) and (23), $\alpha$ is the amplitude of the reluctance torque and, therefore, is set to $\alpha = 1$. The amplitudes of the currents are each approximately $\sqrt{(2\alpha/L\Delta)}$.

The waveforms of the A-phase current $I_A$ (= $\sqrt{(2\alpha/L\Delta)} \cdot \cos\omega t$) and the B-phase current $I_B$ (=$-\sqrt{(2\alpha/L\Delta)} \cdot \sin\omega t$) when $M\Delta = L\Delta$ are respectively shown by a line 510 in FIG. 5A and by a line 520 in FIG. 5B. These are sinusoidal waveforms. A difference between the sinusoidal current waveform shown by the line 510 in FIG. 5A and the waveform of the A-phase current $I_A$ (the line 512) is referred to as "superposition waveform" and shown by a line 511 in FIG. 5A. By superposing the superposition waveform of the line 511 on the sinusoidal current waveform of the line 510, the waveform of the A-phase current $I_A$ shown by the line 512 is provided. Similarly, a difference between the sinusoidal current waveform shown by the line 520 in FIG. 5B and the waveform of the B-phase current $I_B$ (the line 522) is referred to as "superposition waveform" and shown by a line 521 in FIG. 5B. By superposing the superposition waveform of the line 521 on the sinusoidal current waveform of the line 520, the waveform of the B-phase current Is shown by the line 522 is provided. The superposition waveforms (the lines 511 and 521) are each such that a sinusoidal waveform having a frequency twice that of the sinusoidal current waveform (the line 510, 520) with $L\Delta=M\Delta$ is rectified to the same sign as that of the sinusoidal current waveform (the line 510, 520).

Figure 6:
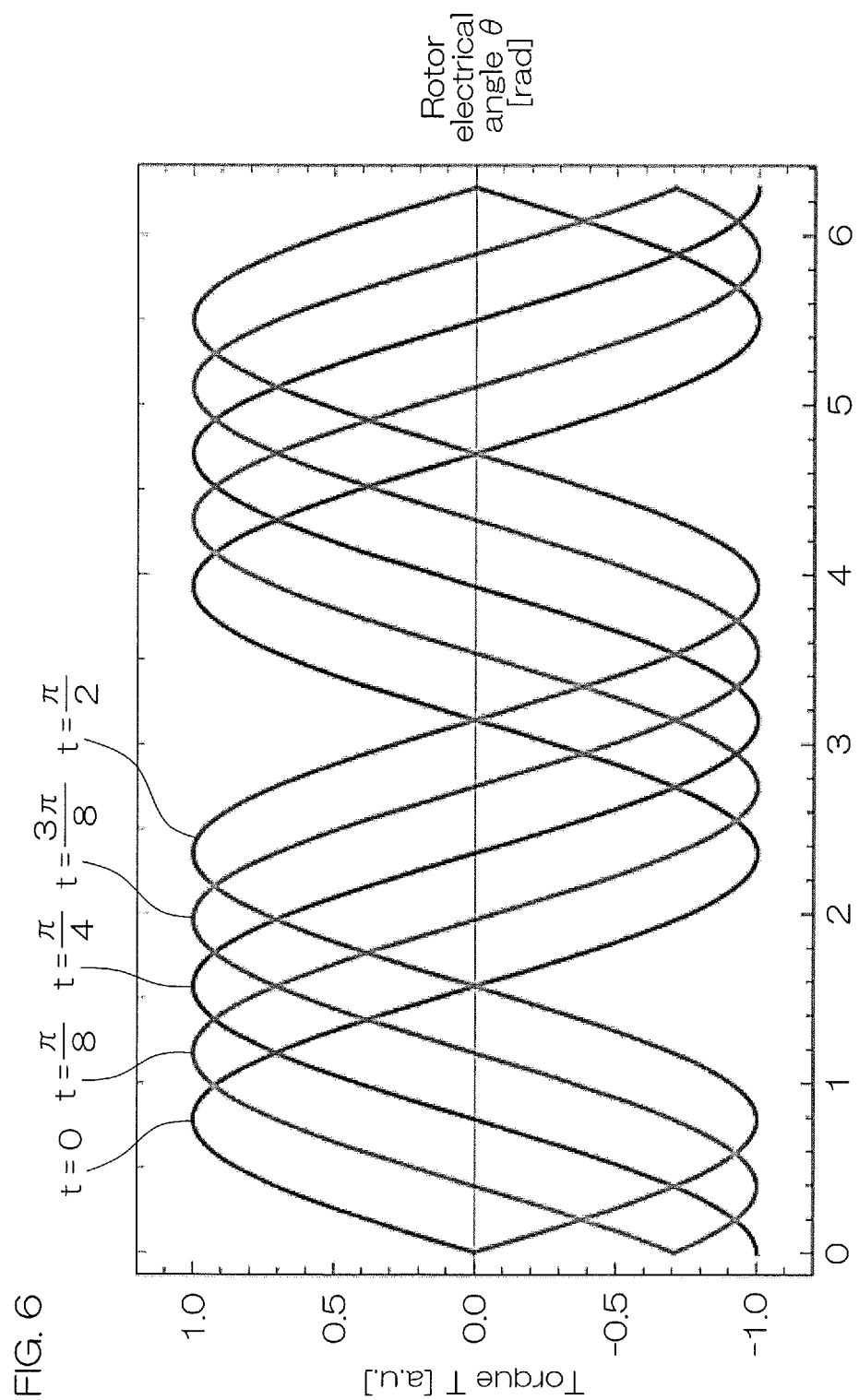
FIG. 6 is a waveform diagram for describing that the fluctuation of the θ-T waveform of the reluctance torque can be eliminated by current correction.

FIG. 6 shows θ-T waveforms of the reluctance torque $T_r$ when $M\Delta=L\Delta/2$. In FIG. 6, θ-T waveforms of the reluctance torque $T_r$ at t=0, π/8, π/4, 3π/8 and π/2 are shown. The waveform of the reluctance torque $T_r$ is invariable in profile with time unlike that shown in FIG. 4B for the motor driving with the sinusoidal currents.

When the motor is excited, the amplitudes $L\Delta$, $M\Delta$ of the angle-differentiated inductances are dependent on the motor currents. Therefore, the fluctuation of the motor current-dependent amplitudes $L\Delta$, $M\Delta$ is preferably taken into consideration for the calculation of the respective phase currents to be supplied to the motor. In an actual application, however, the root calculating operations in the expressions (22) and (23) are complicated, so that fundamental superposition waveforms with the amplitudes $L\Delta$, MA set as constants may be tabulated. Then, the superposition waveforms (the lines 511 and 521 in FIGS. 5A and 5B) to be respectively superposed on the fundamental sinusoidal waves (the lines 510 and 520 in FIGS. 5A and 5B) may be prepared by adjusting the amplitudes of the fundamental superposition waveforms according to the motor currents. Even in this case, the vibrations of the stepping motor can be sufficiently suppressed. When $L\Delta<M\Delta$, this can be coped with by inverting the signs of the superposition waveforms (see lines 511a and 521a in FIGS. 5A, 5B).

The superposition waveforms are not necessarily required to have the exact waveform profiles derived from the expressions (22) and (23). As shown by the lines 511 and 521 in FIGS. 5A and 5B, the superposition waveforms each have a waveform profile such that a harmonic waveform having a frequency twice that of the fundamental sinusoidal wave (the line 510, 520) as the original waveform is full-wave-rectified to the same sign as the fundamental sinusoidal wave. The original waveform is considered to have a sinusoidal waveform profile before being full-wave-rectified into the superposition waveform, but is not sinusoidal in the strict sense. Exactly saying, therefore, the superposition waveforms may each have a waveform profile such that a harmonic-like waveform of the fundamental sinusoidal wave (original waveform) is full-wave-rectified to the same sign as the fundamental sinusoidal wave. Of course, the superposition waveforms may have a waveform profile such that the strict harmonic waveform having a frequency twice that of the fundamental sinusoidal wave is full-wave-rectified to the same sign as the fundamental sinusoidal wave. Even in this case, a certain vibration suppressing effect can be expected.

When $L\Delta<M\Delta$, the superposition waveform (see the line 511a, 521a in FIG. 5A, 5B) has a sign inverted from that of the superposition waveform of the line 511, 521 in FIG. 5A, 5B. In this case, therefore, the superposition waveform has a waveform profile such that the harmonic waveform (more strictly, the harmonic-like waveform) having a frequency twice that of the fundamental sinusoidal wave is full-wave-rectified to a different sign from that of the fundamental sinusoidal wave.

Description will be given to why the superposition waveform is inverted when the amplitude relationship between $L\Delta$ and $M\Delta$ is inverted.

With $L\Delta/M\Delta=\beta$ in the above expression (22) indicating the A-phase current $I_A$, the second term in the double root is subjected to first-order Maclaurin expansion. Then, the double root in the expression (22) is represented as follows:

$$\sqrt{\cos(2\omega t) + \sqrt{\cos^2(2\omega t) + \beta^2\cos^2(2\omega t)}} \cong \quad (22a)$$

$$\sqrt{\cos(2\omega t) + 1} + \frac{\sin^2(2\omega t)}{2\sqrt{\cos(2\omega t) + 1}} \cdot (\beta - 1) =$$

$$\sqrt{2}\left\{\cos(\omega t) + \frac{\sin^2(2\omega t)}{4\cos(\omega t)} \cdot (\beta - 1)\right\}$$

($\omega t \neq n\pi + \pi/2$, $n$ is an integer)

Figure 5C:
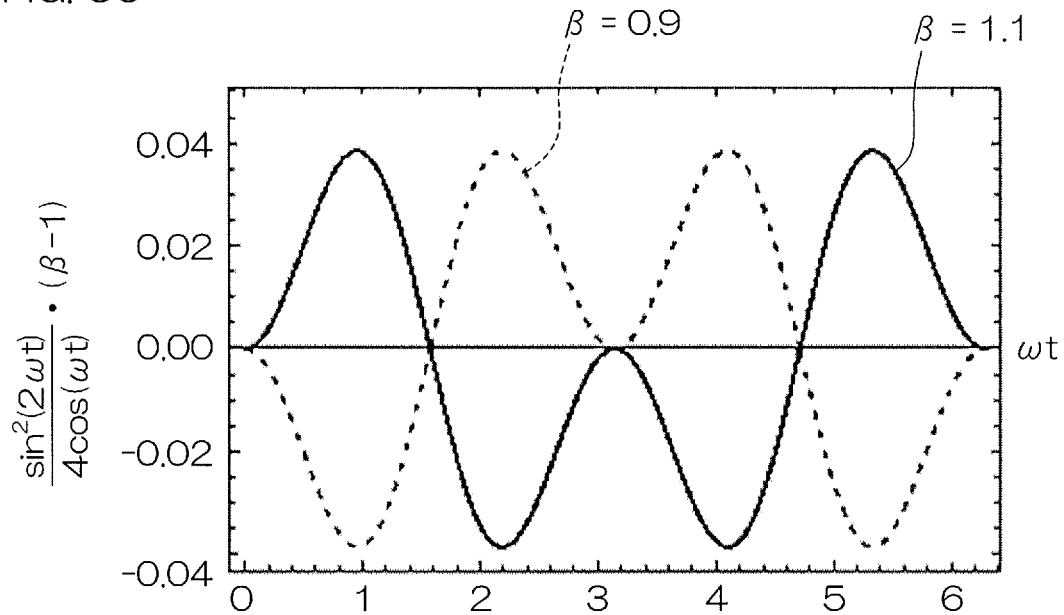
FIGS. 5C and 5D are waveform diagrams for describing the inversion of superposition waveforms depending on an amplitude relationship between the angle-differentiated self-inductance and the angle-differentiated mutual inductance.

The first term is a solution obtained when β=1, and provides a sinusoidal waveform having a frequency @t. The second term is a correction term for a deviation from =1. Second terms obtained when β=1.1 ($M\Delta<L\Delta$) and when β=0.9 ($L\Delta<M\Delta$) are shown by a solid line and a broken line, respectively, in FIG. 5C. The waveform shown by the solid line in FIG. 5C for β=1.1 ($M\Delta<L\Delta$) corresponds to the superposition waveform shown by the line 511 in FIG. 5A. The waveform shown by the broken line in FIG. 5C for β=0.9 ($L\Delta<M\Delta$) is a waveform inverted from the waveform (solid line) for β=1.1 ($M\Delta<L\Delta$). This waveform corresponds to the superposition waveform shown by the line 511a in FIG. 5A (the inverted waveform of the line 511).

Similarly, consideration is given to the B-phase current. With $L\Delta/M\Delta=\beta$ in the above expression (23) indicating the B-phase current $I_B$, the second term in the double root is subjected to first-order Maclaurin expansion. Then, the double root in the expression (23) is represented as follows:

$$-\sqrt{-\cos(2\omega t) + \sqrt{\cos^2(2\omega t) + \beta^2\cos^2(2\omega t)}} \cong \quad (23a)$$

$$\sqrt{2}\left\{-\sin(\omega t) - \frac{\sin^2(2\omega t)}{4\sin(\omega t)} \cdot (\beta - 1)\right\}$$

($\omega t \neq n\pi + \pi/2$, $n$ is an integer)

Figure 5D:
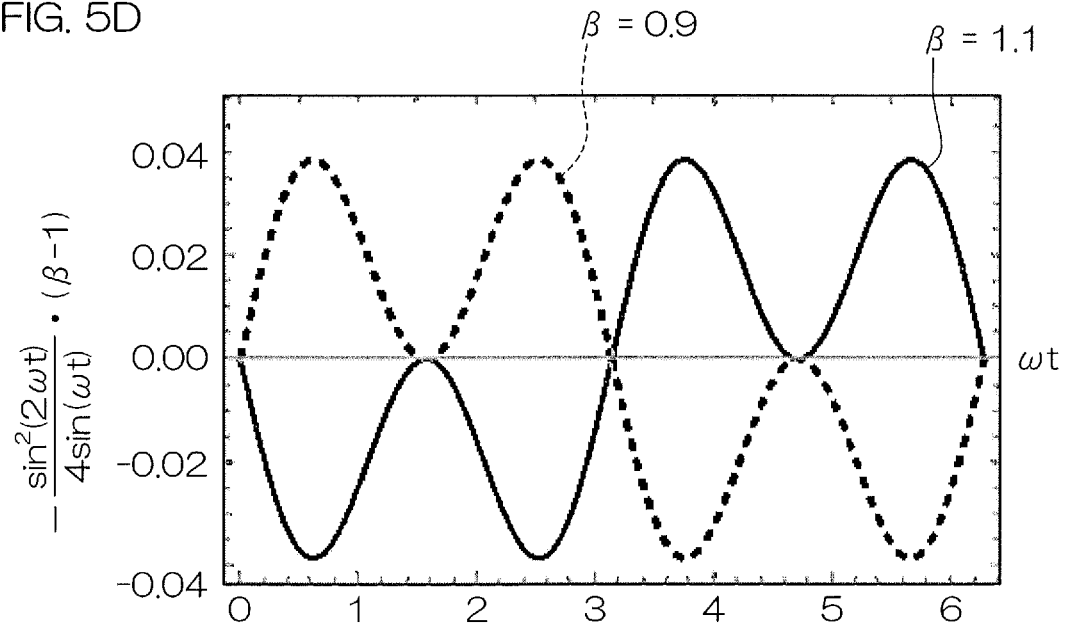

Second terms obtained when β=1.1 ($M\Delta<L\Delta$) and when β=0.9 ($L\Delta<M\Delta$) are shown by a solid line and a broken line, respectively, in FIG. 5D. The waveform shown by the solid line in FIG. 5D for β=1.1 ($M\Delta<L\Delta$) corresponds to the superposition waveform shown by the line 521 in FIG. 5B. The waveform shown by the broken line in FIG. 5D for β=0.9 ($L\Delta<M\Delta$) is a waveform inverted from the waveform (solid line) for β=1.1 ($M\Delta<L\Delta$). This waveform corresponds to the superposition waveform shown by the line 521a in FIG. 5B (the inverted waveform of the line 521).

This indicates that the inversion of the amplitude relationship between $L\Delta$ and $M\Delta$ can be coped with by inverting the superposition waveforms.

[Magnet Torque in Consideration of Nonlinearity]

Figure 7:
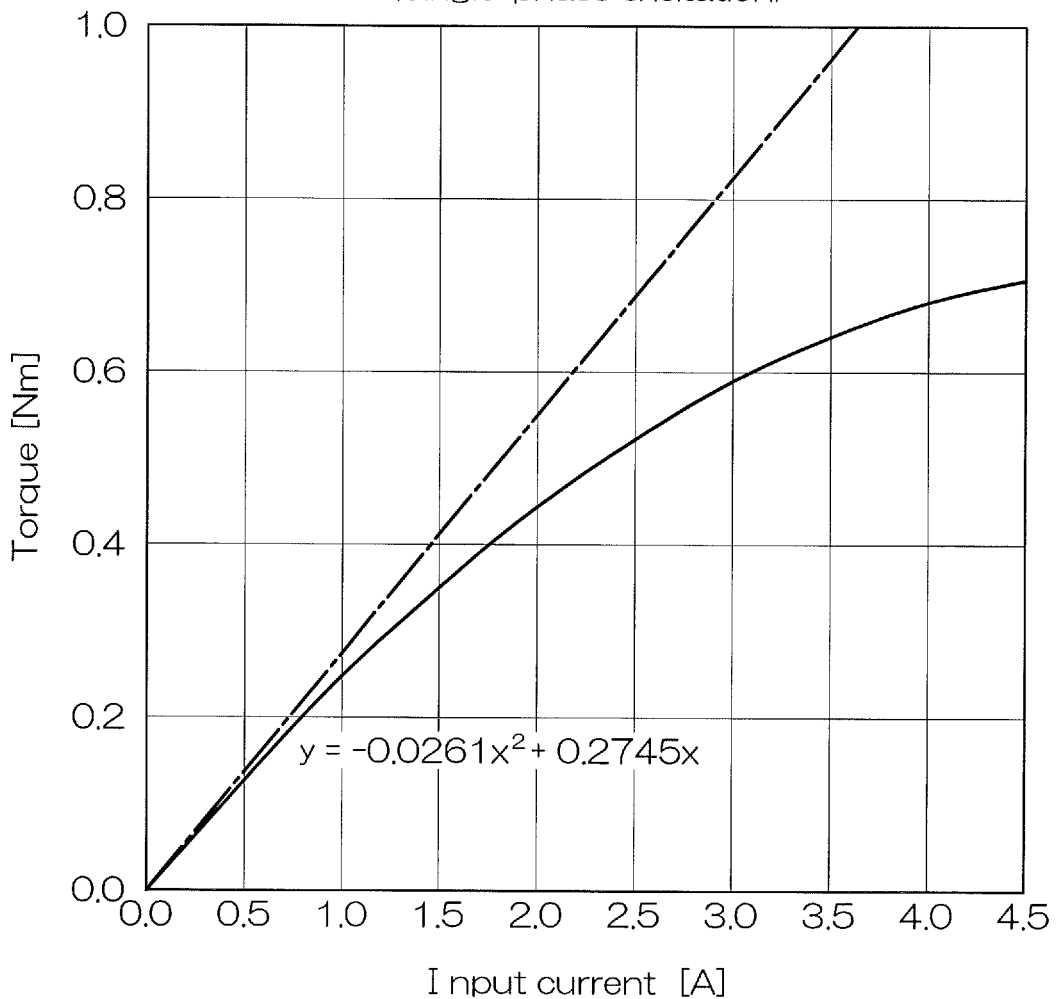
FIG. 7 is a characteristic diagram showing a torque-current characteristic of a hybrid type stepping motor.

Consideration will be given to current correction to be performed when the magnet torque is nonlinear with respect to the current. It is known that there often occurs a phenomenon that the torque is nonlinear with respect to the current in the stepping motor. FIG. 7 shows an example of the torque-current characteristic of the two-phase hybrid type stepping motor. The characteristic of the torque with respect to the input current has a nonlinear torque profile. A quadratic polynomial equation is fitted to this torque profile, wherein a first-order coefficient is defined as a torque constant $k_t$ and a second-order coefficient is defined as $p \cdot k_t$. With the torque constant applied to the expression (2), the magnet torque which is nonlinear with respect to the current is represented as followed:

$$T_M = k_t(I_A(1-pI_A^2)\sin(\theta) + I_B(1-pI_B^2)\cos(\theta)) \quad (24)$$

This equation is solved in the same manner as the equation for the reluctance torque. Then, the following expressions are provided:

$$\begin{cases} \dfrac{d^2}{dt^2}(I_A(1-pI_A^2)) = \omega^2 I_A(1-I_A^2) \\ \dfrac{d^2}{dt^2}(I_B(1-pI_B^2)) = \omega^2 I_B(1-I_B^2) \end{cases} \quad (25)$$

$$\begin{cases} I_A(1-pI_A^2) = \alpha\cos(\omega t + \delta_1) \\ I_B(1-pI_B^2) = \alpha\cos(\omega t + \delta_2) \end{cases} \quad (26)$$

According to Cardano's formula, one of the solutions to $x^3 - px - q = 0$ is as follows:

$$\omega^2 \left\{ \frac{1}{2}\left(q + \sqrt{\frac{-D}{27}}\right)\right\}^{\frac{1}{3}} + \frac{\omega p}{3}\left\{\frac{1}{2}\left(q + \sqrt{\frac{-D}{27}}\right)\right\}^{\frac{1}{3}} \text{ wherein } D = 4p^3 - 27q^2,$$

$$\omega = \frac{-1 + \sqrt{3}i}{2}, \; p \neq 0$$

Based on comparison with the cubic equation (22) to be solved, the coefficients are defined as follows. Then, the solutions are provided as represented by the following expressions (27) and (28), wherein $\delta = \delta_1$ or $\delta_2$.

$$p \to \frac{1}{p}, \; q \to -\frac{\alpha\cos(\omega t + \delta)}{p}$$

$$I_A\text{comp} = -\frac{1 - i\sqrt{3}}{2^{2/3}\left(-27\alpha p^2 \cos(\omega t) + \sqrt{-108p^3 + 729\alpha^2 p^4 \cos^2(\omega t)}\right)^{1/3}} - \\ \frac{(1 + i\sqrt{3})\left(-27\alpha p^2 \cos(\omega t) + \sqrt{-108p^3 + 729\alpha^2 p^4 \cos^2(\omega t)}\right)^{1/3}}{6 \times 2^{1/3} p} \quad (27)$$

$$I_B\text{comp} = -\frac{1 - i\sqrt{3}}{2^{2/3}\left(-27\alpha p^2 \sin(\omega t) + \sqrt{-108p^3 + 729\alpha^2 p^4 \sin^2(\omega t)}\right)^{1/3}} + \\ \frac{(1 + i\sqrt{3})\left(-27\alpha p^2 \sin(\omega t) + \sqrt{-108p^3 + 729\alpha^2 p^4 \sin^2(\omega t)}\right)^{1/3}}{6 \times 2^{1/3} p} \quad (28)$$

In analogy to the current phases for the ideal magnet torque described above, $\delta_1$ and $\delta_2$ are set to $\delta_1 = 0$ and $\delta_2 = \pi/2$ so that the waveform of the magnet torque can be sinusoidal.

$I_A$comp and $I_B$comp of the expressions (27) and (28) are respectively assigned to $I_A$ and $I_B$ in the expression (24). Then, the following expression is provided.

$$T_M = \alpha k_t(\cos(\theta t)\sin(\omega) - \sin(\omega t)\cos(\theta)) = -\alpha k_t \sin(\omega t - \theta) \quad (29)$$

wherein $\alpha$ is the amplitude of the input current. When the discriminant D is D<0, i.e., when the following relationship is satisfied, the solution has imaginary parts.

$$D > 0 \Rightarrow p > \frac{4}{27}\frac{1}{\alpha^2 \cos^2(\omega t + \delta)} \quad (30)$$

The final solutions related to the currents are represented by the following expressions, which each provide a continuous profile with the real part Re and the imaginary part Im added together.

$$I_A = \text{Re}(I_A\text{comp}) + \text{Im}(I_A\text{comp}) \quad (31)$$

$$I_B = \text{Re}(I_B\text{comp}) + \text{Im}(I_B\text{comp}) \quad (32)$$

Consideration will be given to the current correction to be performed, for example, in the case of FIG. 7. The torque constant is $k_t = 0.2745$ (N·m/A), and the second-order coefficient of the torque is $p = 0.095$ (N·m/A²). When D=0, the excitation current $\alpha$ is represented by the following expression. At this time, the current waveform is as shown by a line 802 in FIG. 8. From a phenomenological viewpoint, it can be understood that the excitation current waveform is close to a triangular waveform when a current value at a current peak portion is increased for compensation for the torque reduction in the single-phase excitation.

$$\alpha = \sqrt{\frac{4}{27} \times \frac{1}{0.095}} = 1.248[A] \quad (33)$$

Figure 8:
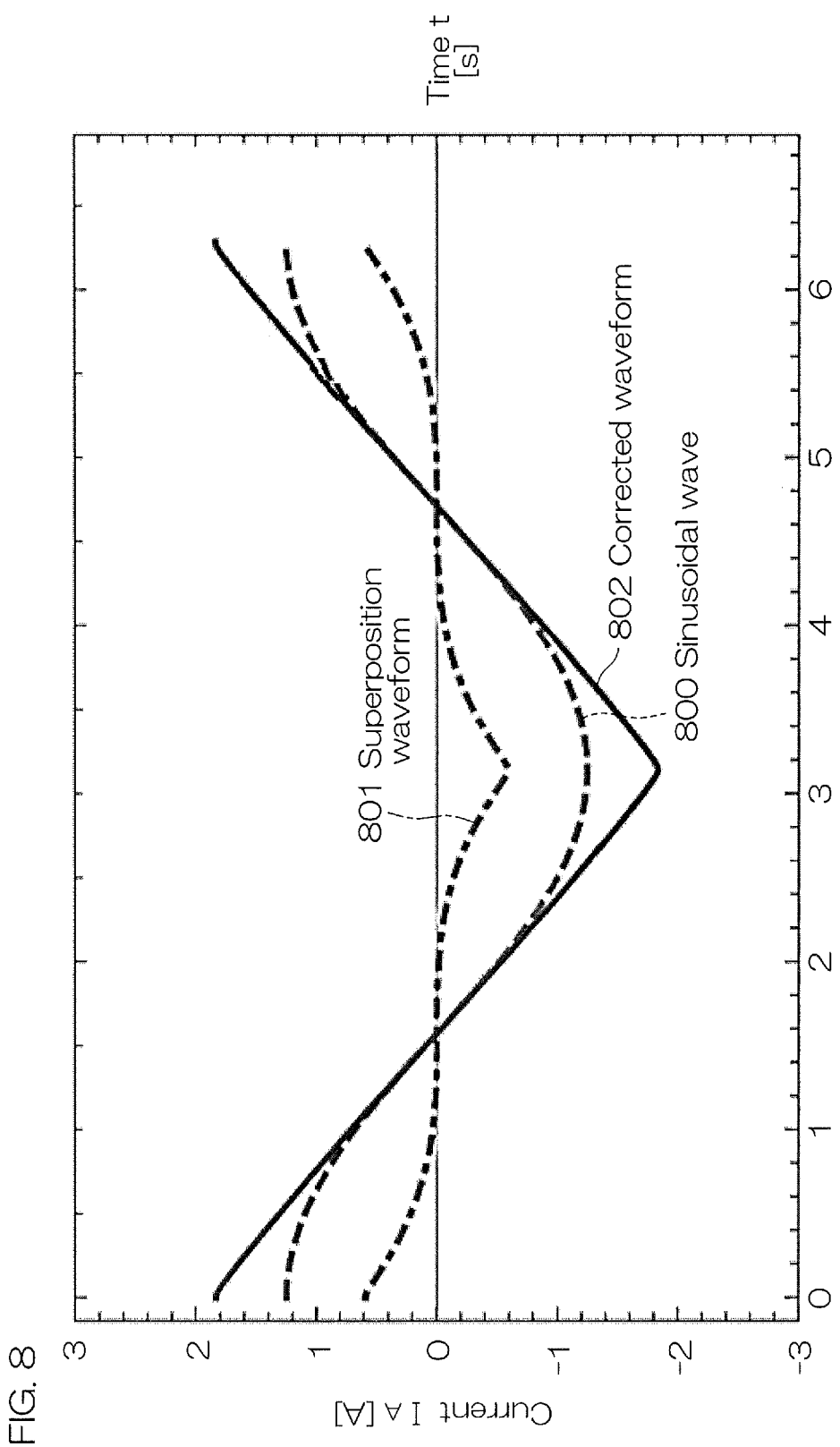
FIG. 8 is a waveform diagram for describing one example of the current correction for compensation for the nonlinearity of the magnet torque with respect to the current.

In FIG. 8, a line 800 indicates a sinusoidal current waveform ($\alpha \cdot \sin\omega t$) before the correction, wherein $\omega = 1$. A superposition waveform corresponding to a difference between the line 802 and the line 800 is shown by a line 801. The superposition waveform of the line 801 is superposed on the sinusoidal current waveform of the line 800, whereby a corrected current waveform of the line 802 is provided.

Figure 9:
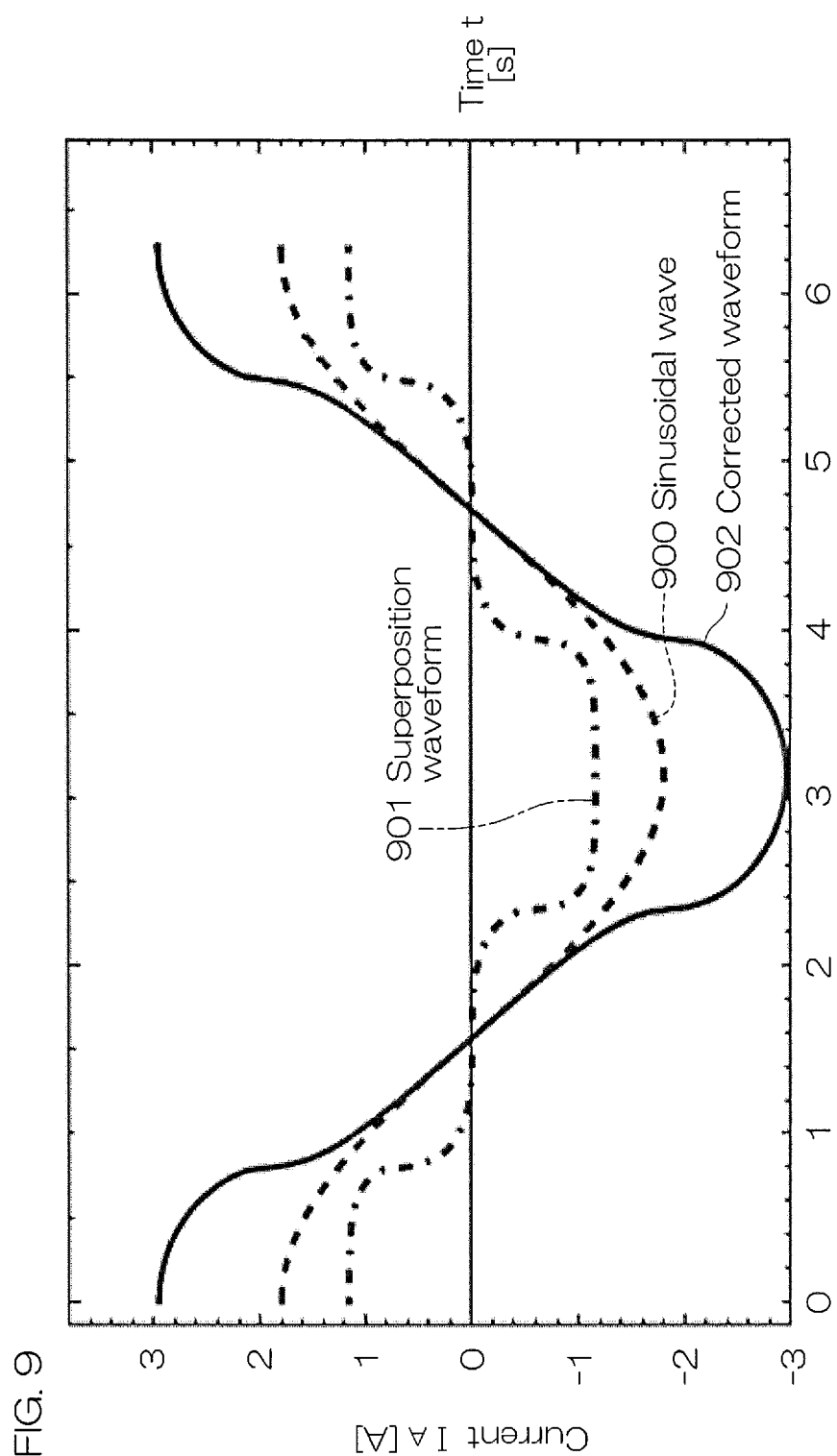
FIG. 9 is a waveform diagram for describing another example of the current correction for compensation for the nonlinearity of the magnet torque with respect to the current.

A corrected current waveform obtained when D>0, e.g., when the excitation current α is α=1.8 (A), is shown by a line 902 in FIG. 9. A sinusoidal current waveform (α·sinωt) before the correction is shown by a line 900 in FIG. 9. A superposition waveform corresponding to a difference between the line 902 and the line 900 is shown by a line 901. The superposition waveform of the line 901 is superposed on the sinusoidal current waveform of the line 900, whereby a corrected current waveform of the line 902 is provided. This indicates that, where the excitation current is increased, the current value at a peak portion need to be further increased.

The superposition waveforms (the lines 801 and 901) for the compensation for the nonlinearity of the magnet torque each have a waveform profile that amplifies the amplitude of the peak portion of the sinusoidal current waveform (the line 800, 900).

Description will be given to a case in which the correction described above is applied to the two-phase hybrid type stepping motor as a specific example. The vibrations of the two-phase hybrid type stepping motor can be reduced to a lower level by the current correction for correcting the reluctance torque. Where the current correction for correcting the nonlinearity term of the magnet torque is additionally employed, a further reduced vibration level can be achieved.

Figure 10:
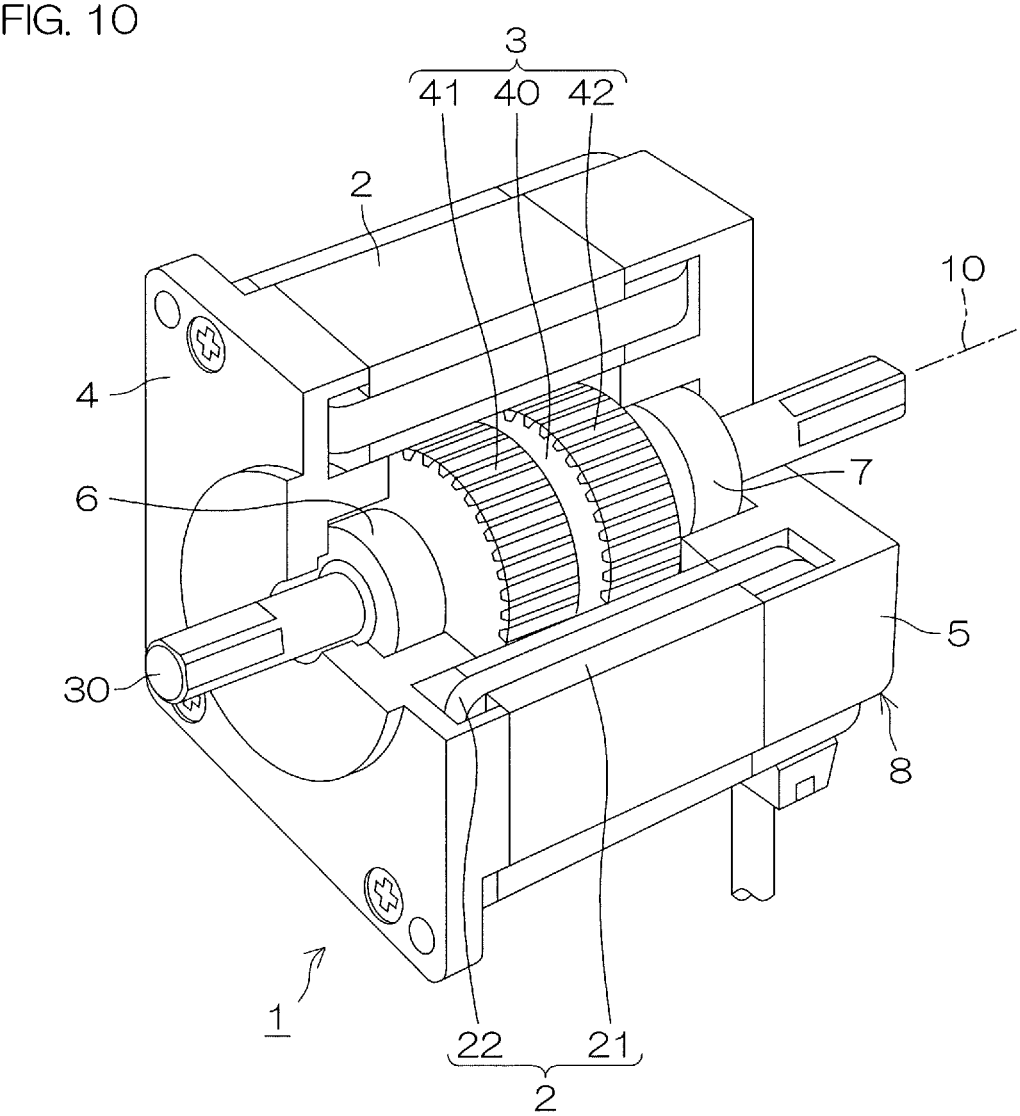
FIG. 10 is a perspective view for describing the structure of a two-phase hybrid type stepping motor by way of example.

FIG. 10 is a perspective view for describing the structure of the two-phase hybrid stepping motor by way of example. The stepping motor 1 includes a stator 2, a rotor 3, a motor flange 4, a bracket 5, and a pair of bearings 6, 7.

The stator 2 includes a stator iron core 21 and windings 22. The motor flange 4 and the bracket 5 are fixed to opposite ends of the stator iron core 21, and these constitute a motor case 8.

The rotor 3 is disposed within the motor case 8 rotatably about a rotation axis 10. The rotor 3 includes a rotation shaft 30 extending along the rotation axis 10, and rotor iron cores supported by the rotation shaft 30. The rotation shaft 30 is supported rotatably by the pair of bearings 6, 7. One of the bearings (bearing 6) is attached to the motor flange 4, and the other bearing 7 is attached to the bracket 5.

Figure 11:
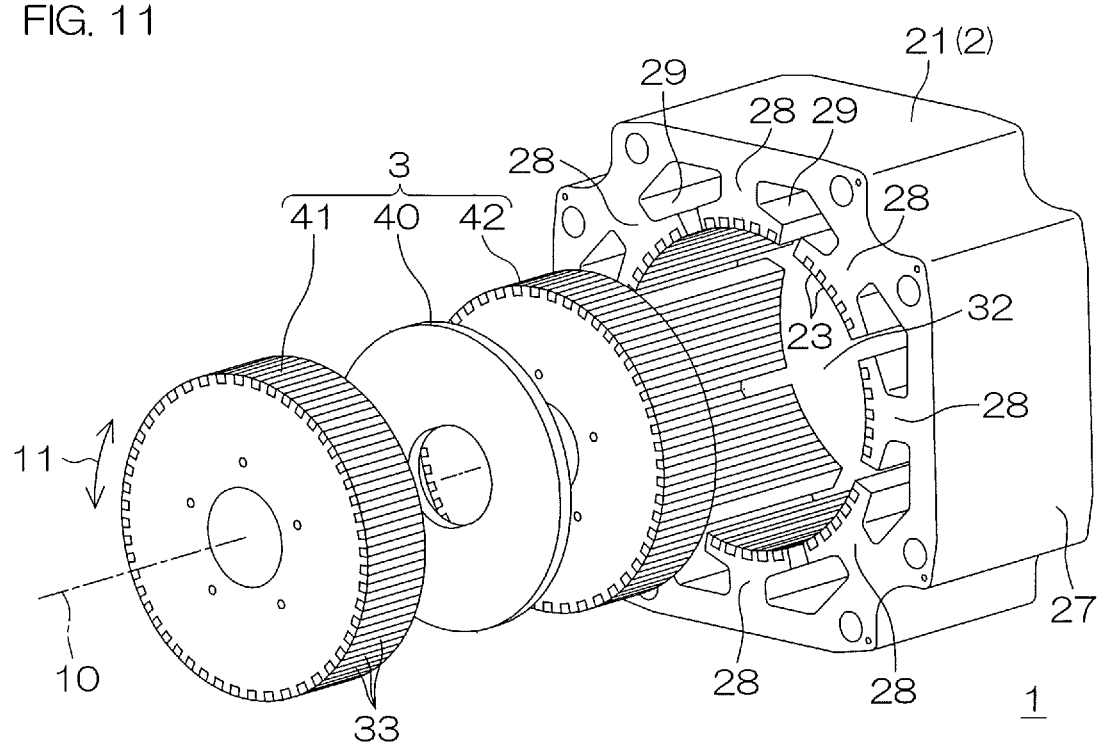
FIG. 11 is an exploded perspective view for describing the structures of a stator and a rotor of the hybrid type stepping motor.

FIG. 11 is an exploded perspective view for describing the structures of the stator 2 and the rotor 3. The rotor 3 includes the rotation shaft 30 extending along the rotation axis 10 (see FIG. 10), a disk-shaped permanent magnet 40 supported by the rotation shaft 30, and a pair of rotor segments (the iron cores) 41, 42 disposed on opposite sides of the permanent magnet 40. The permanent magnet 40 is magnetized along the rotation axis 10. The permanent magnet 40 is held between the pair of rotor segments 41, 42.

A multiplicity of pole teeth (small teeth, rotor teeth) 33 (e.g., 50 pole teeth) are provided equidistantly at a predetermined rotor tooth pitch in a circumferential direction 11 about the rotation axis 10 on the peripheral surface of each of the rotor segments 41, 42. The rotor teeth 33 are linear projections extending parallel to the rotation axis 10. The rotor teeth 33 may be each slightly inclined with respect to the rotation axis 10.

The pair of rotor segments 41, 42 have substantially the same structure. The rotor segments 41, 42 are offset from each other by half the rotor tooth pitch, and fixed to the rotation shaft 30. Therefore, the rotor teeth 33 of the rotor segment 42 are located between respective adjacent pairs of the rotor teeth 33 of the rotor segment 41 as seen along the rotation axis 10.

Figure 12:
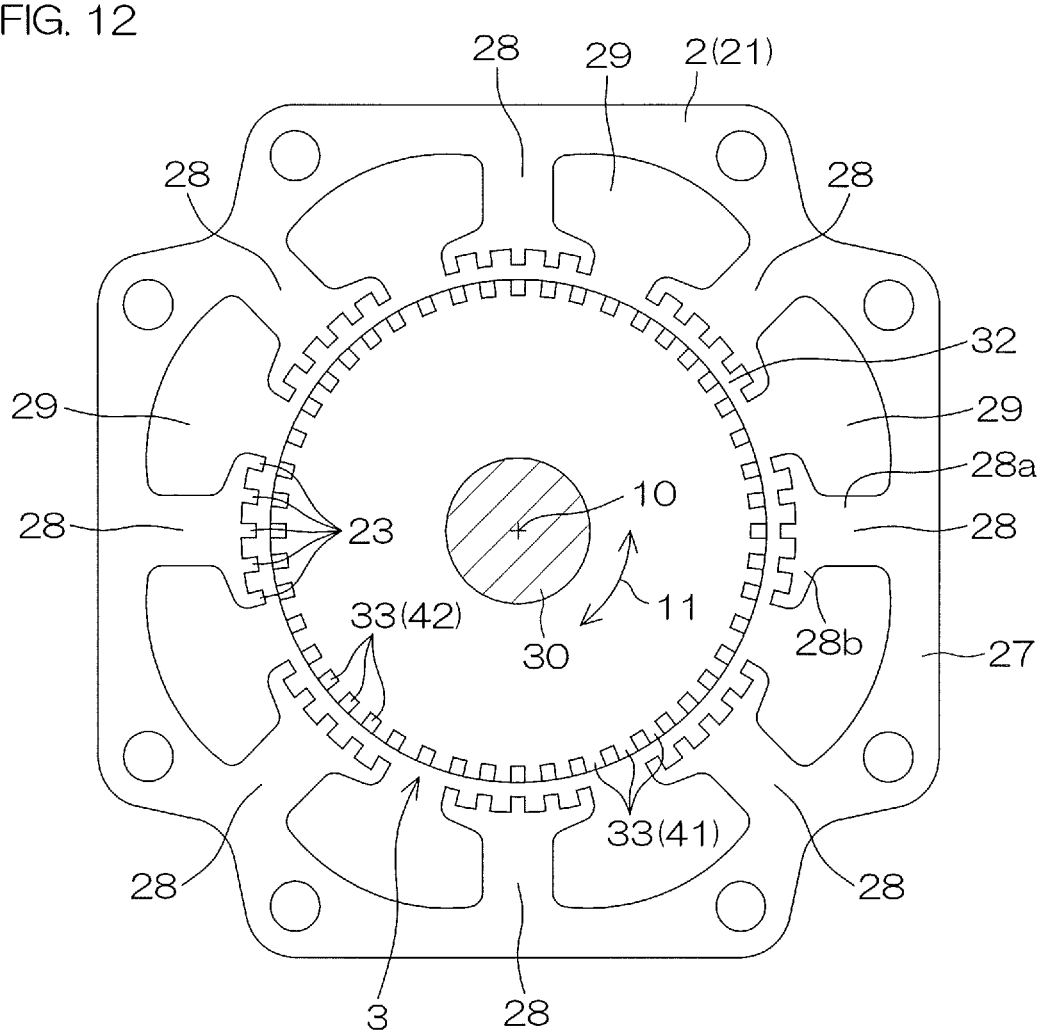
FIG. 12 is a diagram showing the structure of the stator as seen along a rotation axis.

FIG. 12 shows the structure of the stator 2 (the stator iron core 21) as seen along the rotation axis 10. The stator 2 has a generally quadrilateral frame shape as seen along the rotation axis 10. The stator 2 has a rotor accommodation space 32 defined in a center portion thereof, and the rotor 3 is disposed in the rotor accommodation space 32. The rotor accommodation space 32 has a hollow cylindrical shape defined about the rotation axis 10. The stator 2 has a frame-shaped back yoke 27, and a plurality of main poles 28 (magnetic poles) (in this embodiment, eight main poles) each projecting from the back yoke 27 toward the rotation axis 10. The main poles 28 are spaced from each other in the circumferential direction 11 around the rotation axis 10. The main poles 28 are linear projections extending parallel to the rotation axis 10.

The main poles 28 each have a support portion 28a having a proximal end connected to the back yoke 27, and an opposed portion 28b connected to a distal end of the support portion 28a. The opposed portion 28b faces the rotor accommodation space 32 and, therefore, is opposed to the rotor 3. The opposed portion 28b in the circumferential direction 11 to opposite sides of the support portion 28a. Thus, winding slots 29 are provided between respective circumferentially-adjacent pairs of the main poles 28. The windings 22 (see FIG. 10) are disposed in these winding slots 29. More specifically, the windings 22 are respectively wound around the main poles 28, and are accommodated in the winding slots 29 between respective adjacent pairs of the main poles 28. The opposed portion 28b has an opposition surface which is opposed to the rotor 3. The opposition surface is formed with a plurality of stator teeth 23 (small teeth) which project toward the rotation axis 10. The stator teeth 23 are linear projections extending along the rotation axis 10. The stator teeth 23 are provided equidistantly at a predetermined stator tooth pitch in the circumferential direction 11. Where the rotor teeth 33 are inclined with respect to the rotation axis 10, the stator teeth 23 are correspondingly inclined with respect to the rotation axis 10.

Figure 13:
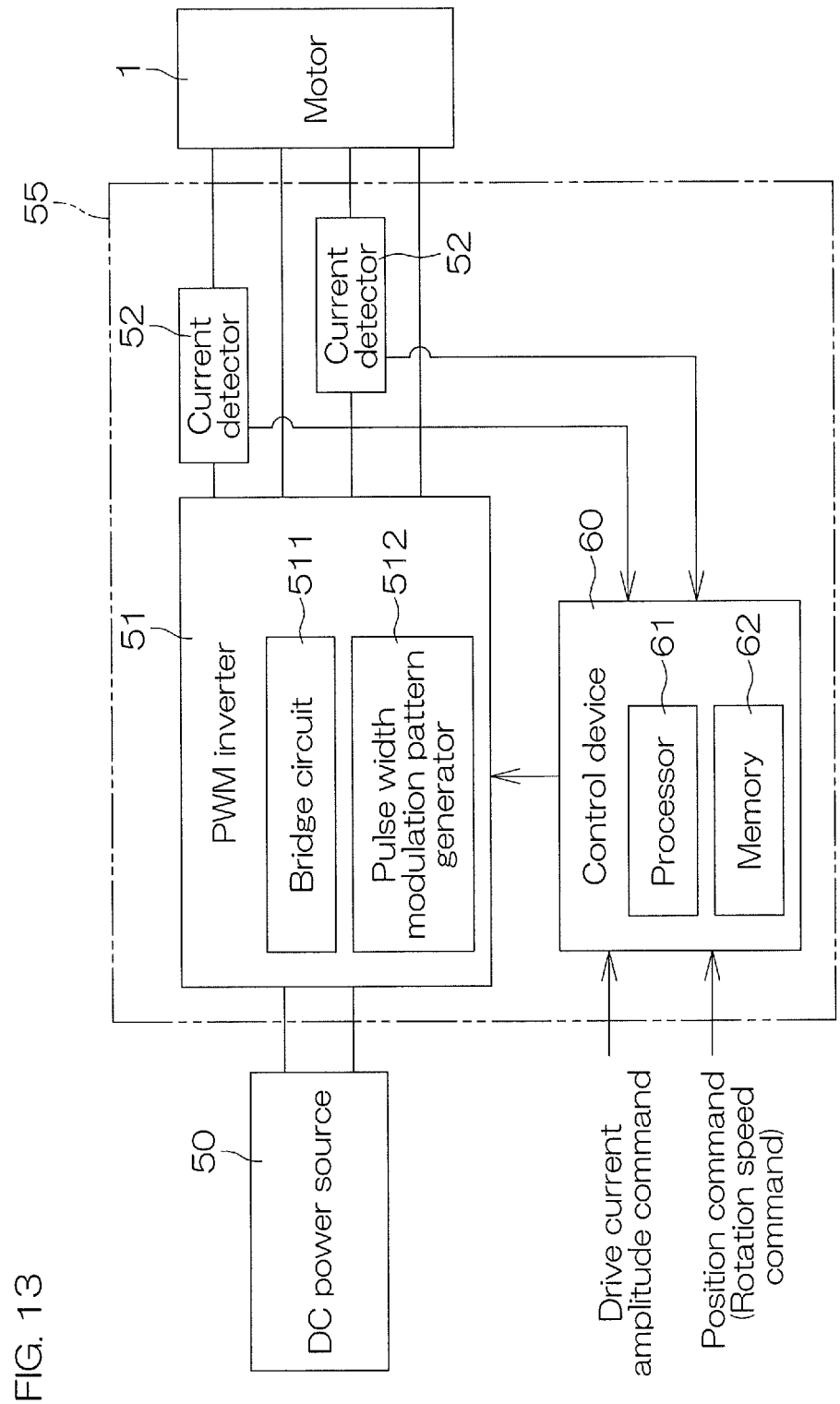
FIG. 13 is a block diagram for describing an exemplary electrical configuration for the control and the driving of the stepping motor.

FIG. 13 is a block diagram for describing the electrical configuration for the control and the driving of the stepping motor by way of example. Electric power is supplied from a DC power source 50 to the stepping motor 1 via a driving circuit section 55. The driving circuit section 55 is an example of the motor control device, and includes a PWM inverter 51, current detectors 52, and a control device 60. The PWM inverter 51 supplies the electric power from the DC power source 50 to the stepping motor 1. The PWM inverter 51 is controlled by the control device 60. The PWM inverter 51 includes a bridge circuit 511 for a plurality of phases corresponding to the plural phase windings of the stepping motor 1, and a pulse width modulation pattern generator 512 which generates a PWM (pulse width modulation) control signal which turns on and off switching elements (power devices) of the bridge circuit 511. The control device 60 applies a voltage command to the PWM inverter 51. The pulse width modulation pattern generator 512 generates the PWM control signal according to the voltage command. The current detectors 52 each detect a current (motor current) flowing through the corresponding phase of the stepping motor 1.

The control device 60 monitors the detection signals of the current detectors 52, and performs a constant current control operation on the stepping motor 1. More specifically, the control device 60 drives the stepping motor 1 by an open-loop constant current control without the position feedback and the speed feedback. The control device 60 typically includes a processor 61 (CPU) and a memory 62, and is configured so that the processor 61 executes a program stored in the memory 62 to perform a plurality of functions. The memory 62 may include one or more storage media. The memory 62 preferably includes storage media which is rewritable and capable of retaining data even during the off of the power source. The processor 61 performs data transaction with the memory 62, performs computation, and generates a voltage command for controlling the PWM inverter 51. The processor 61 controls the PWM inverter 51 according to a drive current amplitude command and a position command (or a rotation speed command) which are applied from the outside or internally generated, thereby driving the stepping motor 1 according to the drive current amplitude command and the position command (or the rotation speed command).

Figure 14:
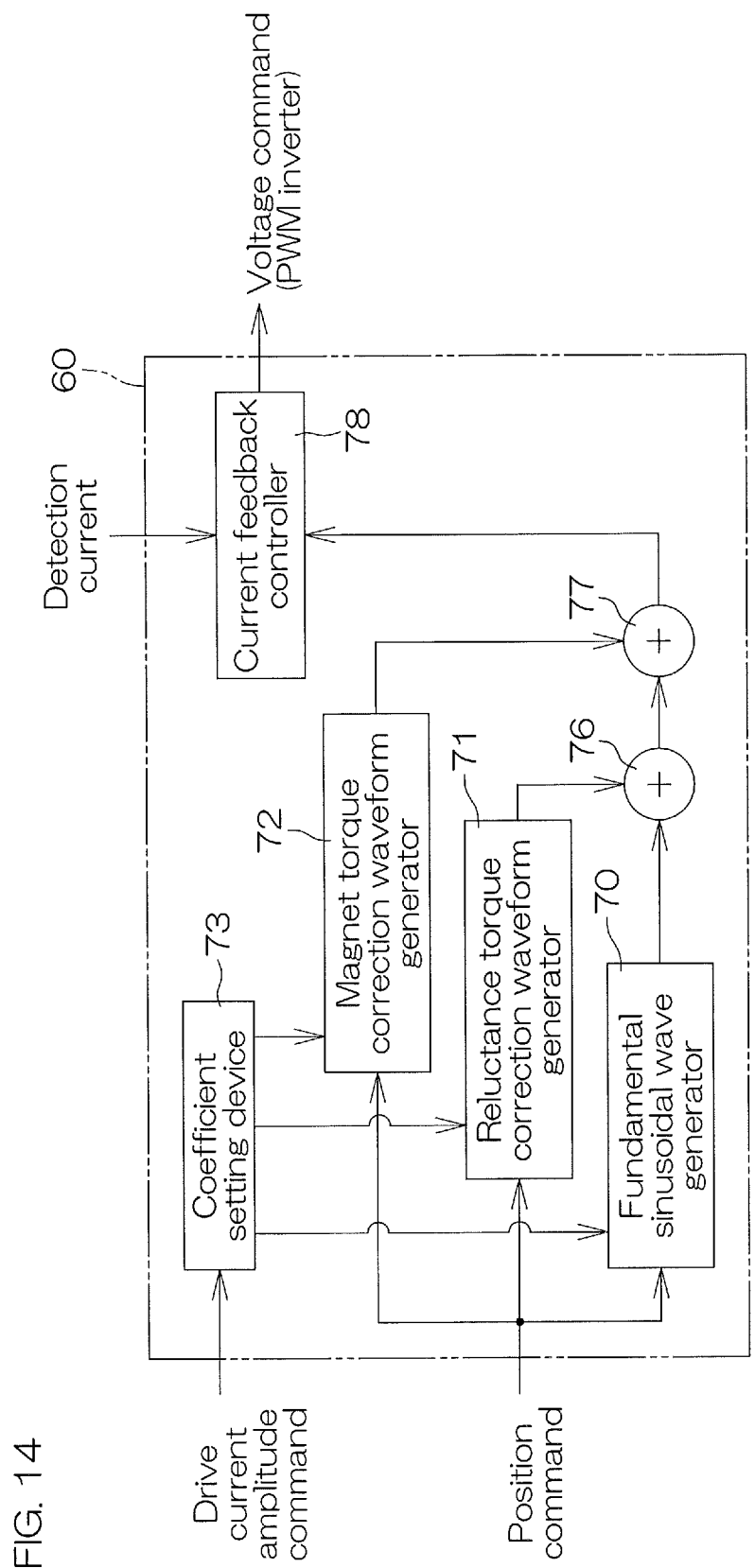
FIG. 14 shows an exemplary control block for the control of the stepping motor.

FIG. 14 is an exemplary control block of the control device 60 related to the control of the stepping motor. The processor 61 executes the program stored in the memory 62, whereby the functions of a plurality of blocks shown in FIG. 14 are achieved. Thus, the control device 60 virtually includes a fundamental sinusoidal wave generator 70, a reluctance torque correction waveform generator 71, a magnet torque correction waveform generator 72, a coefficient setting device 73, a first adder 76, a second adder 77, and a current feedback controller 78.

The fundamental sinusoidal wave generator 70 generates a fundamental sinusoidal wave (fundamental sinusoidal current waveform) for the sinusoidal wave driving of the stepping motor 1. The fundamental sinusoidal wave generator 70 may include a table which indicates a fundamental waveform for the generation of the fundamental sinusoidal wave, and the table may be stored in the memory 62. The fundamental waveform has a sinusoidal waveform profile. The fundamental waveform is multiplied by a fundamental sinusoidal wave coefficient set by the coefficient setting device 73 to thereby generate the fundamental sinusoidal wave. The fundamental sinusoidal wave corresponds to any of the waveforms shown by the lines 510, 520, 800 and 900, respectively, in FIGS. 5A, 5B, 8 and 9. The fundamental sinusoidal wave generator 70 determines a frequency based on the position command (or the rotation speed command), and generates the fundamental sinusoidal wave at that frequency.

The reluctance torque correction waveform generator 71 generates a reluctance correction waveform for the current correction for the reluctance torque. The reluctance correction waveform is any of the superposition waveforms shown by the lines 511 and 521, respectively, in FIGS. 5A and 5B. The reluctance torque correction waveform generator 71 may include a table which indicates a fundamental correction waveform for the superposition waveform, and this table may be stored in the memory 62. The fundamental correction waveform is multiplied by a reluctance torque correction coefficient set by the coefficient setting device 73 to thereby generate the reluctance torque correction waveform corresponding to the superposition waveform (the line 511, 521). The reluctance torque correction waveform generator 71 determines a frequency based on the position command (or the rotation speed command), and generates the reluctance torque correction waveform at that frequency.

The magnet torque correction waveform generator 72 generates a magnet torque correction waveform for the current correction for the nonlinearity term of the magnet torque. The magnet torque correction waveform corresponds to any of the superposition waveforms shown by the lines 801 and 901, respectively, in FIGS. 8 and 9. The magnet torque correction waveform generator 72 generates the magnet torque correction waveform corresponding to the superposition waveform (the line 801, 901) according to a magnet torque correction coefficient set by the coefficient setting device 73. The magnet torque correction waveform generator 72 determines a frequency based on the position command (or the rotation speed command), and generates the magnet torque correction waveform at that frequency.

The coefficient setting device 73 generates various coefficients based on the drive current amplitude command. Specifically, the coefficient setting device 73 generates the fundamental sinusoidal wave coefficient for defining the amplitude of the fundamental sinusoidal wave to be generated by the fundamental sinusoidal wave generator 70.

The coefficient setting device 73 further generates the reluctance torque correction coefficient for defining the amplitude of the reluctance torque correction waveform to be generated by the reluctance torque correction waveform generator 71 based on the drive current amplitude command. By thus generating the reluctance torque correction coefficient based on the drive current amplitude command, the reluctance torque correction waveform can be properly generated according to the motor current for reduction of the influence of the fluctuation of the reluctance torque. Specifically, the reluctance torque correction coefficient corresponds to $(L\Delta/M\Delta-1)\times(\alpha/L\Delta)$. By the multiplication by $(L\Delta/M\Delta-1)$ (corresponding to $(\beta-1)$ in the above expressions (22a) and (23a)), the sign of the reluctance torque correction coefficient is inverted according to the relationship between the amplitudes $L\Delta$ and $M\Delta$ of the angle-differentiated inductances. Where the reluctance torque correction waveform generator 71 generates the fundamental correction waveform corresponding to the superposition waveform of the line 511, 521 in FIG. 5A, 5B, for example, a positive reluctance torque correction coefficient is generated for $L\Delta \geq M\Delta$, and a negative reluctance torque correction coefficient is generated for $L\Delta < M\Delta$.

The amplitudes $L\Delta$ and $M\Delta$ of the angle-differentiated inductances vary depending on the motor current, and current-dependent variation values are determined by the design of each stepping motor 1. Therefore, the values of $L\Delta$ and $M\Delta$ which are variable according to the motor current can be preliminarily determined based on the analysis of the design of the stepping motor 1 or the measurement performed after the production of the stepping motor 1. Since the reluctance torque correction coefficient which is variable with respect to the motor current can be determined based on the values of $L\Delta$ and $M\Delta$ thus determined, the values of the reluctance torque correction coefficient may be preliminarily tabulated. Thus, the reluctance torque correction coefficient can be generated which properly varies with respect to the motor current. Of course, a table containing the values of $L\Delta$ and $M\Delta$ with respect to the motor current may be prepared, and the reluctance torque correction coefficient may be determined as corresponding to the drive current amplitude command (which is virtually equivalent to the motor current) by computation based on the table.

The coefficient setting device 73 further generates the magnet torque correction coefficient for the correction for the nonlinearity term of the magnet torque based on the drive current amplitude command. Specifically, the coefficient setting device 73 generates $\alpha$ and $p$ in the expressions (27) and (28) as the magnet torque correction coefficient, and applies the magnet torque correction coefficient to the magnet torque correction waveform generator 72. The magnet torque correction waveform generator 72 generates the magnet torque correction waveform (corresponding to the superposition waveform 801, 901 in FIG. 8, 9) based on the applied magnet torque correction coefficient.

The first adder 76 and the second adder 77 superpose the reluctance torque correction waveform and the magnet torque correction waveform, respectively, on the fundamental sinusoidal wave generated by the fundamental sinusoidal wave generator 70, whereby the control current waveform is generated. In the example of FIG. 14, the reluctance torque correction waveform is superposed on the fundamental sinusoidal wave, and then the magnet torque correction waveform is superposed on the resulting waveform. However, the superposing order may be changed, i.e., the magnet torque correction waveform may be superposed on the fundamental sinusoidal wave, and then the reluctance torque correction waveform may be superposed on the resulting waveform. Of course, the reluctance torque correction waveform and the magnet torque correction waveform may be superposed one on the other, and then the fundamental sinusoidal wave may be superposed on the resulting waveform. Thus, the fundamental sinusoidal wave generator 70, the reluctance torque correction waveform generator 71, the magnet torque correction waveform generator 72, the coefficient setting device 73, and the adders 76, 77 constitute the control current waveform generating means.

The current feedback controller 78 generates the voltage command according to the control current waveform, and applies the voltage command to the PWM inverter 51. More specifically, a difference between a command current according to the control current waveform generated by the superposition of the correction waveform on the fundamental sinusoidal wave and the detection current detected by the current detector 52 is fed back to the voltage command, whereby the current feedback controller 78 performs the constant current control. A vector control may be performed on a rotor rotation coordinate system or on a position command coordinate system. In this case, the fundamental sinusoidal wave and the superposition waveform may be superposed one on the other on a DC axis.

The pulse width modulation pattern generator 512 provided in the PWM inverter 51 is an example of the current control signal generating means which generates the PWM control signal (current control signal) for supplying phase currents of the control current waveforms to the respective phase windings of the stepping motor 1. The switching elements provided in the bridge circuit 511 of the PWM inverter 51 are controlled according to the PWM control signal.

It is noted that the feature of the current correction for the nonlinearity term of the magnet torque may be obviated. In this case, the addition result obtained in the first adder 76 may be applied as it is (or after being subjected to necessary modification) to the current feedback controller 78 without the provision of the magnet torque correction waveform generator 72 and the second adder 77 in the configuration of FIG. 14.

Figure 15:
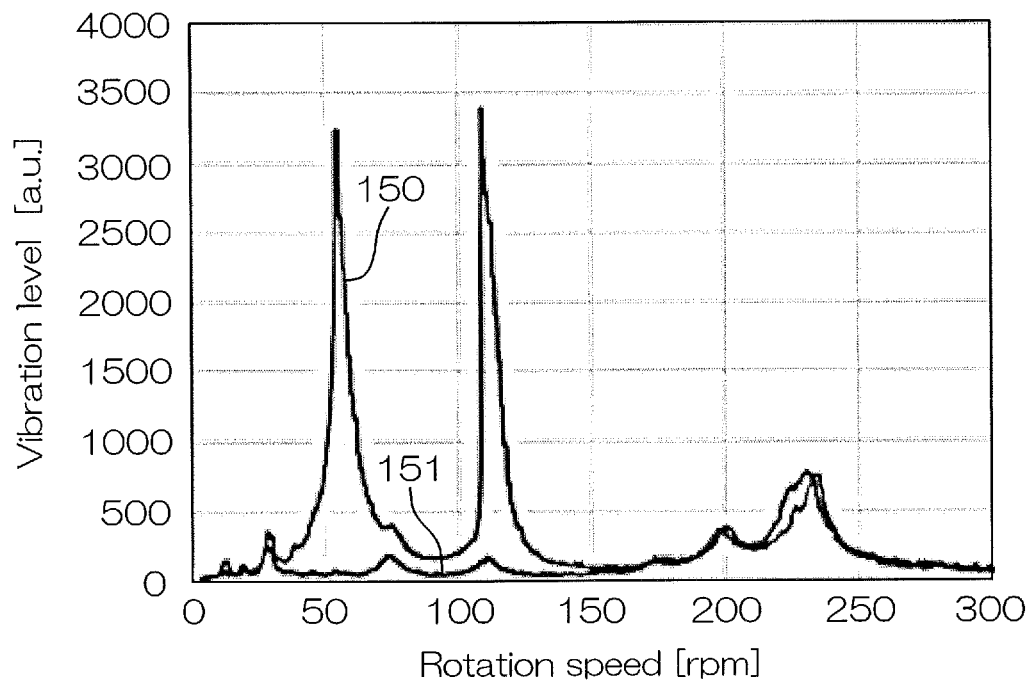
FIG. 15 is a diagram showing the measurement of the rotational vibrations of the stepping motor by way of example.
Figure 16:
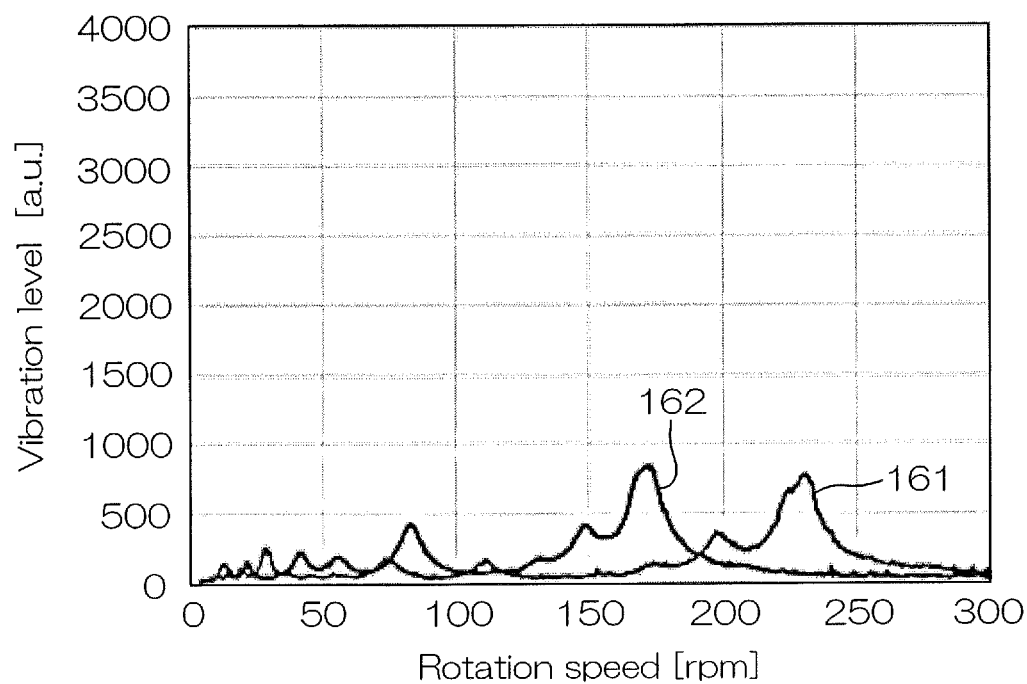
FIG. 16 is a diagram showing the measurement of the rotational vibrations of the stepping motor by way of example.

The measurement rotational vibrations observed in the arrangement shown in FIGS. 10 to 14 is shown in FIGS. 15 and 16 by way of example. The stepping motor 1 used for the measurement is a two-phase hybrid type stepping motor having a mounting angle size of 28 mm, a motor length of 32 mm, an excitation maximum static torque of 0.1 N·m, a rotor inertia moment of $9.2 \times 10^{-7}$ kg·m$^2$, and a rotor tooth number of 50. A line 150 in FIG. 15 indicates a relationship between the rotation speed and the rotational vibration level observed when neither the current correction for the reluctance torque nor the current correction for the magnet torque was performed. A line 151 in FIG. 15 indicates a relationship between the rotation speed and the rotational vibration level observed when the current correction for the reluctance torque and the current correction for the magnet torque were performed. Lines 161 and 162 in FIG. 16 indicate relationships between the rotation speed and the rotational vibration level observed when the aforementioned current corrections were performed. The line 161 indicates a measurement result obtained when the motor was driven at a rated current, and the line 162 indicates a measurement result obtained when the drive current was 50% of the rated current.

Without the corrections, as indicated by the line 150 in FIG. 15, the rotational vibration level is high when the rotation speed is about 60 rpm and about 120 rpm. The frequency component of the vibrations observed at this time is 200 Hz at a peak, and this is the eigenfrequency of the rotor. When the rotation speed is 60 rpm, the frequency of the motor current fundamental wave is 50 Hz. When the rotation speed is 120 rpm, the frequency of the motor current fundamental wave is 100 Hz. As shown, the vibrations occur when the rotation speed is about 60 rpm and the frequency of the current fundamental wave is one fourth the eigenfrequency of the rotor (fourth-order vibrations). Further, the vibrations occur when the rotation speed is about 120 rpm and the frequency of the current fundamental wave is one half the eigenfrequency of the rotor (second-order vibrations).

With the current corrections, as shown by the line 151 in FIG. 15, the rotational vibration level is significantly low. Even if the drive current is changed, as shown in FIG. 16, the vibrations are suppressed by changing the current correction value according to the drive current.

Description will be given to a case in which the aforementioned corrections are applied to a slot magnet type stepping motor as another specific example. In the slot magnet type stepping motor, a lower vibration level can be achieved by the aforementioned current correction for correcting the reluctance torque. In the slot magnet type stepping motor, the current correction for correcting the nonlinearity term of the magnet torque is not necessarily required and, even if being obviated, a lower vibration level can be achieved.

Figure 17:
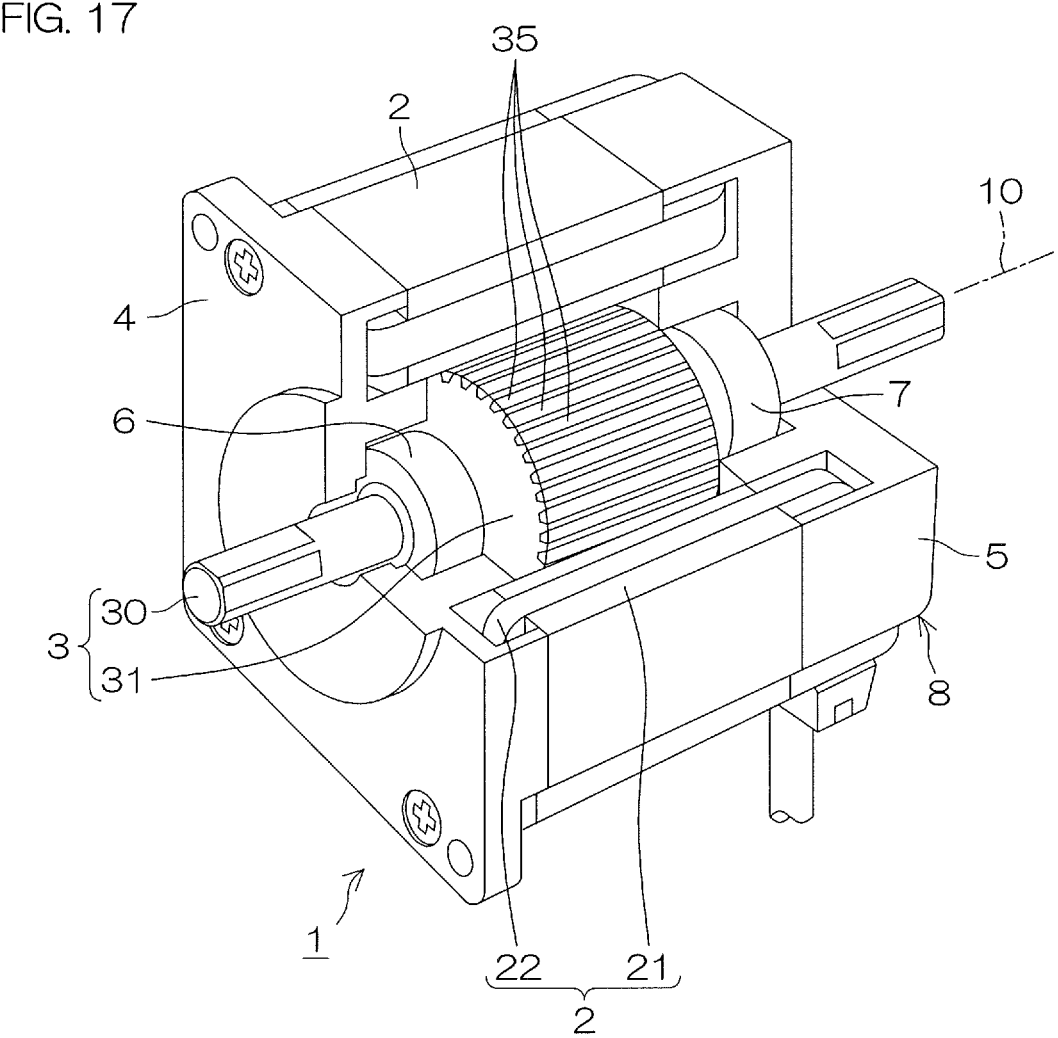
FIG. 17 is a perspective view for describing the structure of a two-phase slot magnet type stepping motor by way of example.

FIG. 17 shows the structure of the slot magnet type stepping motor by way of example. In FIG. 17, components corresponding to those shown in FIG. 10 and the like are denoted by the same reference characters for convenience, but this does not mean that the components shown in FIG. 17 are substantially the same as the components shown in FIG. 10 and the like.

The stepping motor 1 includes a stator 2, a rotor 3, a motor flange 4, a bracket 5, and a pair of bearings 6, 7.

The stator 2 includes a stator iron core 21 and windings 22. The motor flange 4 and the bracket 5 are fixed to opposite ends of the stator iron core 21, and these constitute a motor case 8.

The rotor 3 is disposed within the motor case 8 rotatably about a rotation axis 10. The rotor 3 includes a rotation shaft 30 disposed along the rotation axis 10, and a rotor iron core 31 supported by the rotation shaft 30. The rotation shaft 30 is supported rotatably by the pair of bearings 6, 7. One of the bearings (bearing 6) is attached to the motor flange 4, and the other bearing 7 is attached to the bracket 5.

Figure 18:
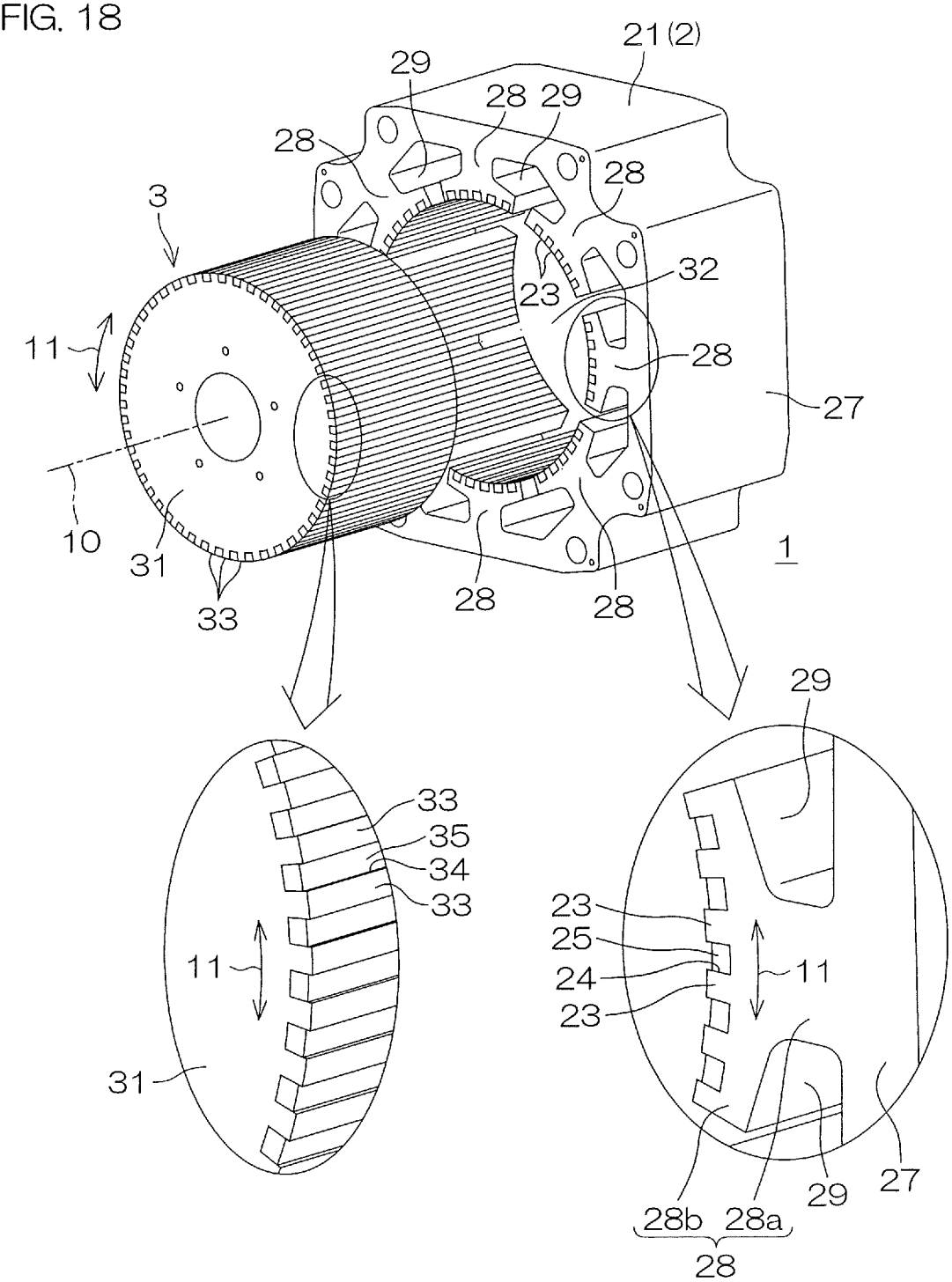
FIG. 18 is an exploded perspective view for describing the structures of a stator and a rotor of the slot magnet type stepping motor.

FIG. 18 is an exploded perspective view for describing the structures of the stator 2 and the rotor 3.

Rotor teeth 33 are provided equidistantly at a predetermined tooth pitch in a circumferential direction 11 on the outer peripheral surface of the rotor iron core 31. The rotor teeth 33 each extend parallel to the rotation axis 10. Alternatively, the rotor teeth 33 may each be inclined with respect to the rotation axis 10.

Rotor slots 34 are provided between respective adjacent pairs of the rotor teeth 33. Rotor slot magnets 35 are respectively inserted in the rotor slots 34. The rotor slot magnets 35 are rod-shaped hard magnetic inserts (typically, permanent magnet pieces) respectively extending along the rotor slots 34. The rotor slot magnets 35 are respectively fixed within the rotor slots 34, for example, with an adhesive.

The stator iron core 21 includes a frame-shaped back yoke 27, and a plurality of main poles 28. The main poles 28 each extend from the back yoke 27 toward the rotor iron core 31, and are spaced from each other in the circumferential direction 11 to surround the rotor iron core 31. Thus, the main poles 28 define a rotor accommodation space 32 having a generally hollow cylindrical shape about the rotation axis 10. The windings 22 (see FIG. 17, not shown in FIG. 18) are respectively wound around the main poles 28.

The main poles 28 each have a support portion 28a connected to the back yoke 27, and an opposed portion 28b connected to a distal end of the support portion 28a. The opposed portion 28b faces the rotor accommodation space 32 and, therefore, is opposed to the rotor iron core 31. The opposed portion 28b extends in the circumferential direction 11 to the opposite sides of the support portion 28a. Thus, winding slots 29 are provided between respective circumferentially-adjacent pairs of the main poles 28. The windings 22 are disposed in these winding slots 29. The opposed portion 28b has an opposition surface which is opposed to the rotor iron core 31. The opposition surface is formed with a plurality of stator teeth 23 which project toward the rotation axis 10. The stator teeth 23 are provided equidistantly at a predetermined tooth pitch in the circumferential direction 11. The stator teeth 23 extend along the rotation axis 10 so as to correspond to the rotor teeth 33. Where the rotor teeth 33 are inclined with respect to the rotation axis 10, the stator teeth 23 are correspondingly inclined with respect to the rotation axis 10.

Stator slots 24 are provided between respective adjacent pairs of the stator teeth 23. Stator slot magnets 25 are respectively inserted in the stator slots 24. The stator slot magnets 25 are rod-shaped hard magnetic inserts (typically, permanent magnet pieces) respectively extending along the stator slots 24. The stator slot magnets 25 are respectively fixed within the stator slots 24, for example, with an adhesive.

The rotor slot magnets 35 and the stator slot magnets 25 are each magnetized radially of the rotation axis 10. The expression "radially of the rotation axis 10" means "perpendicularly to the rotation axis 10." Therefore, the rotor slot magnets 35 are each magnetized along the depth of the rotor slot 34. Further, the stator slot magnets 25 are each magnetized along the depth of the stator slot 24. The rotor slot magnets 35 respectively have the same magnetization directions as the stator slot magnets 25 radially of the rotation axis 10. With the rotor slot magnets 35 respectively opposed to the stator slot magnets 25, therefore, the polarities of the rotor slot magnets 35 are opposite from the polarities of the opposed stator slot magnets 25.

Figure 19:
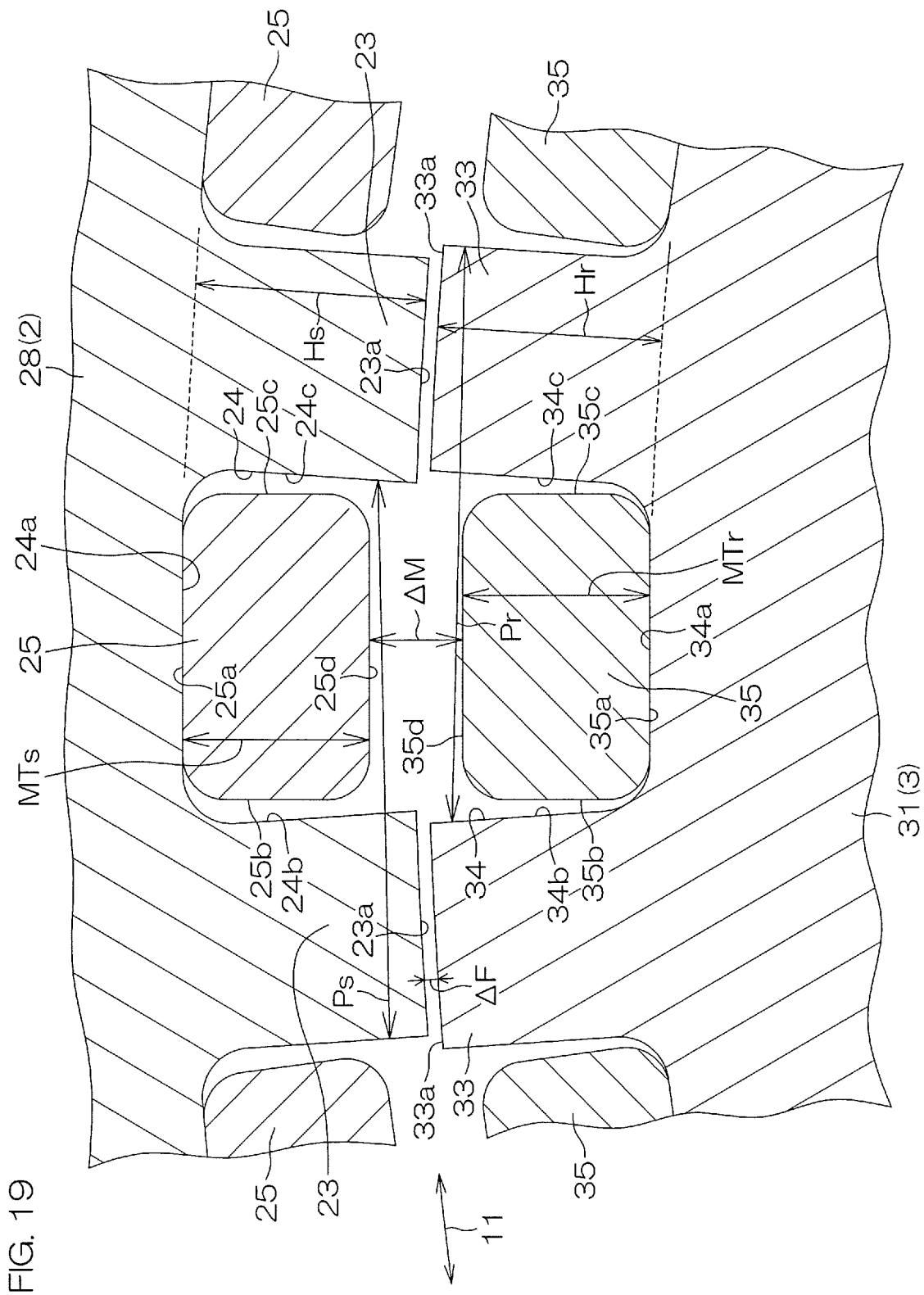
FIG. 19 is a partially enlarged sectional view showing rotor teeth and stator teeth of the slot magnet type stepping motor on an enlarged scale.

FIG. 19 is a partial enlarged sectional view showing the rotor teeth 33 and the stator teeth 23 on an enlarged scale.

The rotor teeth 33 are linear projections each extending in a direction intersecting the circumferential direction 11 (movement direction). The rotor teeth 33 each project radially outward (away from the rotation axis 10) as having a generally constant width in a sectional plane perpendicular to the rotation axis 10. The rotor teeth 33 each have a top surface 33a facing away from the rotation axis 10. The top surfaces 33a of the rotor teeth 33 extend in the circumferential direction 11 about the rotation axis 10. The rotor teeth 33 have substantially congruent sectional shapes, and are arranged equidistantly at a predetermined rotor tooth pitch Pr in the sectional plane perpendicular to the rotation axis 10. The rotor slots 34 provided between the respective adjacent pairs of the rotor teeth 33 are each defined by a pair of generally parallel side surfaces 34b, 34c of the rotor teeth 33 and a bottom surface 34a present between the side surfaces 34b and 34c, and each have a generally rectangular sectional shape. The bottom surface 34a extends in the circumferential direction 11 about the rotation axis 10. The rotor teeth 33 each have a height (hereinafter referred to as "rotor tooth height Hr") as measured from the bottom surface 34a of the rotor slot 34 to the top surface 33a of the rotor tooth 33.

The rotor slot magnets 35 are rod-shaped inserts (typically, permanent magnet pieces) each made of a hard magnetic material and extending along the rotation axis 10. In this embodiment, the rotor slot magnets 35 each have a generally rectangular sectional shape as taken perpendicularly to the rotation axis 10. The rotor slot magnets 35 each have a bottom surface 35a opposed to the bottom surface 34a of the rotor slot 34, a top surface 35d (opposition surface) located opposite from the bottom surface 35a away from the rotation axis 10, and a pair of side surfaces 35b, 35c extending between the bottom surface 35a and the top surface 35d. Edge portions of the bottom surface 35a and the top surface 35d connected to the side surfaces 35b, 35c are chamfered to be arcuately curved in section. The bottom surface 35a of the rotor slot magnet 35 is bonded (fixed) to the bottom surface 34a of the rotor slot 34, for example, with the adhesive.

The top surface 35d of the rotor slot magnet 35 serves as the opposition surface which is opposed to the stator 2. In this embodiment, the top surface 35d is recessed from a virtual cylindrical surface defined by connecting the outer peripheral surfaces (top surfaces 33a) of the rotor teeth 33 toward the rotation axis 10. That is, a magnet thickness (rotor magnet thickness) MTr which is equivalent to a distance between the bottom surface 35a and the top surface 35d is smaller than the depth of the rotor slot 34 (which is equivalent to the rotor tooth height Hr). Thus, the rotor slot magnets 35 are respectively entirely accommodated in the rotor slots 34. The top surfaces 35d are substantially parallel to the virtual cylindrical surface. In a strict sense, the top surfaces 35d may each be a flat surface, which may be parallel to a plane defined by connecting opening edges of the corresponding rotor slot 34. In this embodiment, the rotor slot magnets 35 respectively inserted in the rotor slots 34 have substantially the same shape and size.

The stator teeth 23 are linear projections each extending in the direction intersecting the circumferential direction 11 (movement direction). The stator teeth 23 respectively extend parallel to the rotor teeth 33. The stator teeth 23 each project radially inward (toward the rotation axis 10) as having a generally constant width in the sectional plane perpendicular to the rotation axis 10. The stator teeth 23 each have a top surface 23a facing toward the rotation axis 10. The top surfaces 23a of the stator teeth 23 extend in the circumferential direction 11 about the rotation axis 10. The stator teeth 23 have substantially congruent sectional shapes, and are arranged equidistantly at a predetermined stator tooth pitch Ps in the sectional plane perpendicular to the rotation axis 10. The stator slots 24 provided between the respective adjacent pairs of the stator teeth 23 are each defined by a pair of generally parallel side surfaces 24b, 24c of the stator teeth 23 and a bottom surface 24a present between the side surfaces 24b and 24c, and each have a generally rectangular sectional shape. The bottom surface 24a extends in the circumferential direction 11 about the rotation axis 10. The stator teeth 23 each have a height (hereinafter referred to as "stator tooth height Hs") as measured from the bottom surface 24a of the stator slot 24 to the top surface 23a of the stator tooth 23.

The stator slot magnets 25 are rod-shaped inserts (typically, permanent magnet pieces) each made of a hard magnetic material and extending along the rotation axis 10. In this embodiment, the stator slot magnets 25 each have a generally rectangular sectional shape as taken perpendicularly to the rotation axis 10. The stator slot magnets 25 each have a bottom surface 25a opposed to the bottom surface 24a of the stator slot 24, a top surface 25d (opposition surface) located opposite from the bottom surface 25a on the side of the rotation axis 10, and a pair of side surfaces 25b, 25c extending between the bottom surface 25a and the top surface 25d. Edge portions of the bottom surface 25a and the top surface 25d connected to the side surfaces 25b, 25c are chamfered to be arcuately curved in section. The bottom surface 25a of the stator slot magnet 25 is bonded (fixed) to the bottom surface 24a of the stator slot 24, for example, with the adhesive.

The top surface 25d of the stator slot magnet 25 serves as the opposition surface which is opposed to the rotor 3. In this embodiment, the top surface 25d is recessed from a virtual cylindrical surface defined by connecting the inner peripheral surfaces (top surfaces 23a) of the stator teeth 23 away from the rotation axis 10. That is, a magnet thickness (stator magnet thickness) MTs which is equivalent to a distance between the bottom surface 25a and the top surface 25d is smaller than the depth of the stator slot 24 (which is equivalent to the stator tooth height Hs). Thus, the stator slot magnets 25 are respectively entirely accommodated in the stator slots 24. The top surfaces 25d are substantially parallel to the virtual cylindrical surface. In a strict sense, the top surfaces 25d may each be a flat surface, which may be parallel to a plane defined by connecting opening edges of the corresponding stator slot 24. In this embodiment, the stator slot magnets 25 respectively inserted in the stator slots 24 have substantially the same shape and size.

The rotor slot magnets 35 and the stator slot magnets 25 have substantially the same shape and size. When the rotor tooth 33 and the stator tooth 23 are opposed to each other, a predetermined gap (space) is defined between the rotor tooth 33 and the stator tooth 23 in an opposition direction, i.e., radially (in the depth direction of the slots 34, 24). This gap is referred to as iron gap ΔF. When the rotor slot 34 and the stator slot 24 are opposed to each other, a predetermined gap is defined between the rotor slot magnet 35 and the stator slot magnet 25 in an opposition direction, i.e., radially (in the depth direction of the slots 34, 24). This gap is referred to as magnet gap ΔM.

The slot magnet type stepping motor generally has a significantly improved holding torque as compared with the hybrid type stepping motor. Where the ratio between the self-inductance and the mutual inductance is significantly changed depending on the shapes and the positional arrangement of the magnets, on the other hand, the rotational vibrations and the stop angle error are liable to be exacerbated. Particularly, the ratio (hereinafter referred to as "gap ratio ΔM/ΔF") of the magnet gap ΔM (inter-magnet gap, which is an air gap between the stator slot magnet 25 and the rotor slot magnet 35) with respect to the iron gap ΔF (inter-iron gap, which is an air gap between the stator 2 and the rotor 3 (rotor core)) has a significant influence.

Figure 20A:
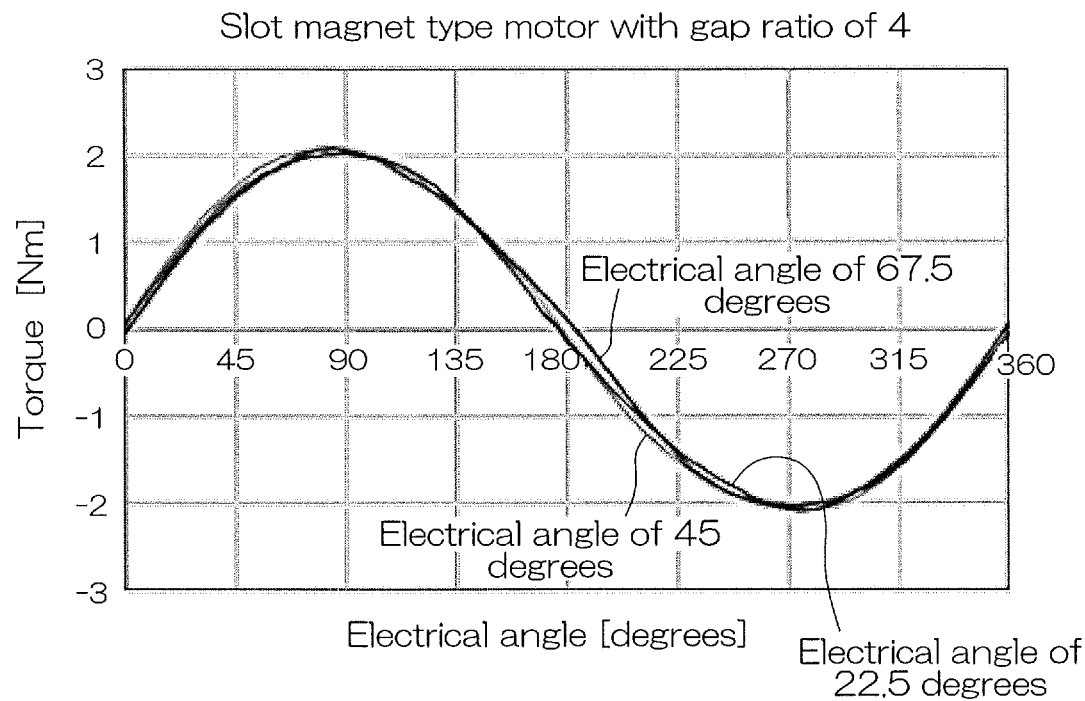
FIGS. 20A and 20B are diagrams showing the results of the magnetic analysis of θ-T waveforms of slot magnet type stepping motors respectively having gap ratios of 4 and 8.
Figure 20B:
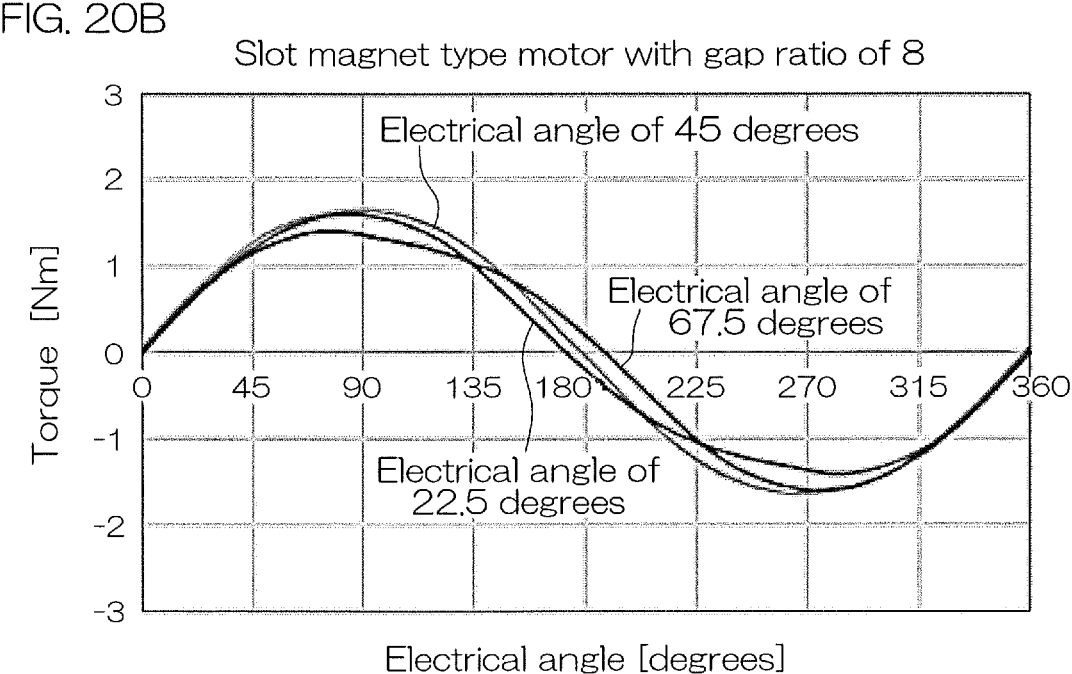

FIGS. 20A and 20B show the results of the magnetic analysis of the θ-T waveforms of slot magnet type stepping motors. On assumption that the current is a sinusoidal current, the rotor angle dependence of the torque was determined when the excitation was caused at specific electrical angles, i.e., π/8, π/4 and 3π/8. In FIGS. 20A and 20B, the torque zero point is illustrated as coinciding with the electrical angle zero point for easier visual understanding of the fluctuation of the waveforms. A two-phase slot magnet type stepping motor having a mounting angle size of 60 mm, a motor length of 40 mm, a rotor inertia moment of $370 \times 10^{-7}$ kg·m$^2$, and a rotor tooth number of 50 was used for the analysis. Two such slot magnet type motors were prepared, which had significantly different characteristics with their magnet thicknesses MTr, MTs set differently. One of the slot magnet type stepping motors had a gap ratio ΔM/ΔF of 4, and its characteristic is shown in FIG. 20A. The other slot magnet type stepping motor had a gap ratio ΔM/ΔF of 8, and its characteristic is shown in FIG. 20B. The former had a holding torque of 2.0 Nm, and the latter had a holding torque of 1.3 N·m. A hybrid type stepping motor having the same physical construction, for example, has a holding torque of 1.1 N·m.

A comparison between FIGS. 20A and 20B indicates that, in the case of the slot magnet type motor having a gap ratio ΔM/ΔF of 8, the waveform fluctuation significantly varies depending on the excitation phase. This results in exacerbation of the rotational vibrations and the stop angle error.

Figure 21A:
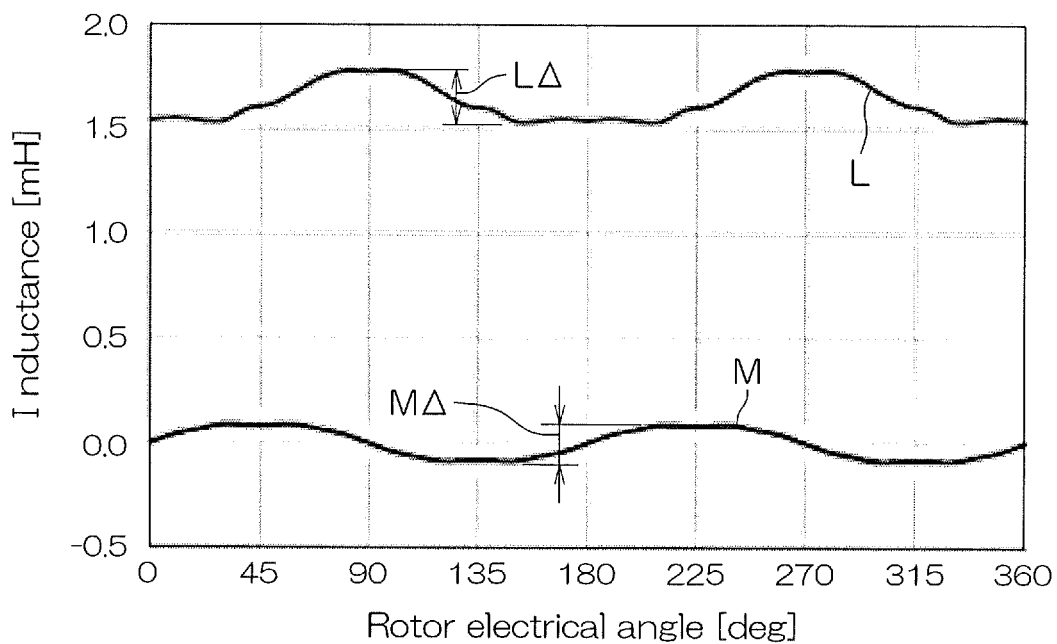
FIGS. 21A and 21B are diagrams showing the results of the analysis of the self-inductance and the mutual inductance of the slot magnet type stepping motor having a gap ratio of 4.
Figure 21B:
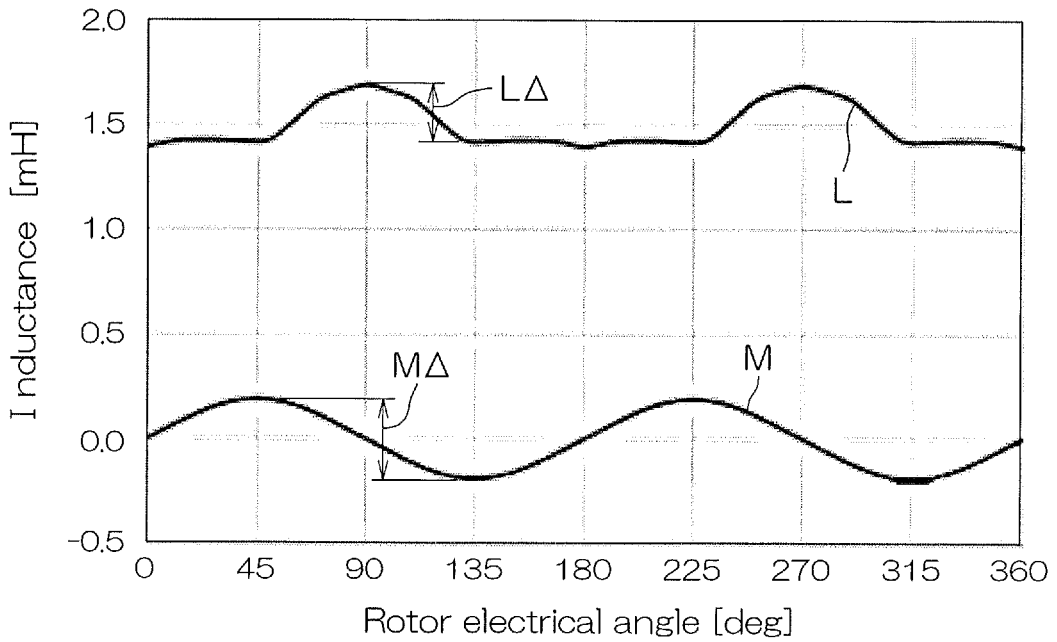
Figure 22A:
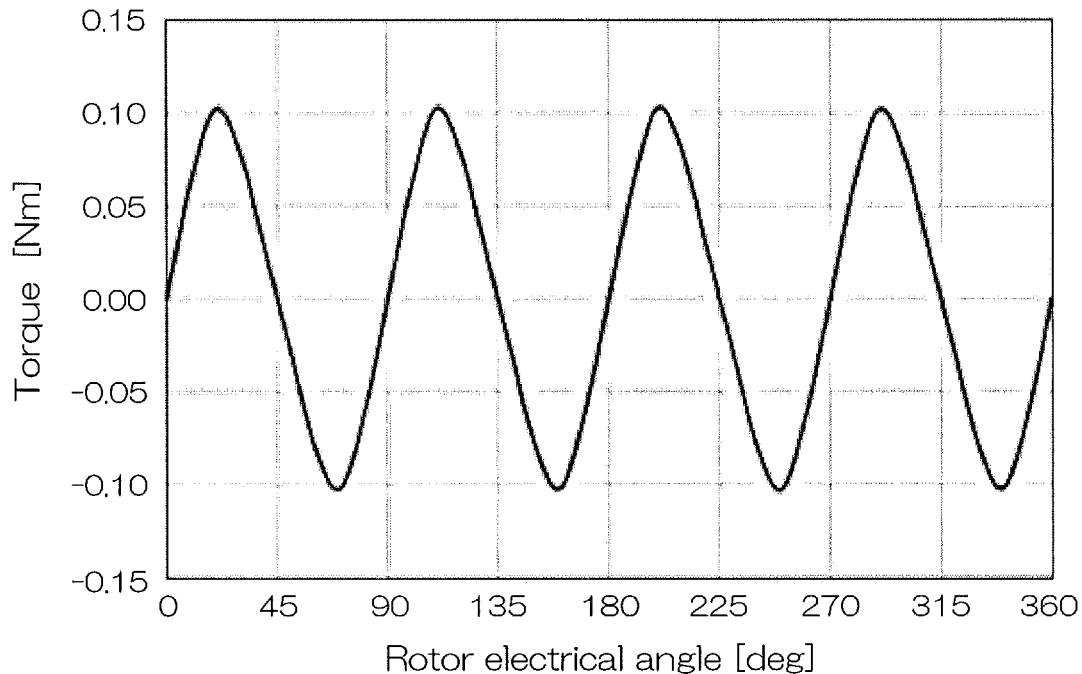
FIGS. 22A and 22B are diagrams showing the results of the torque analysis of the slot magnet type stepping motor having a gap ratio of 4.
Figure 22B:
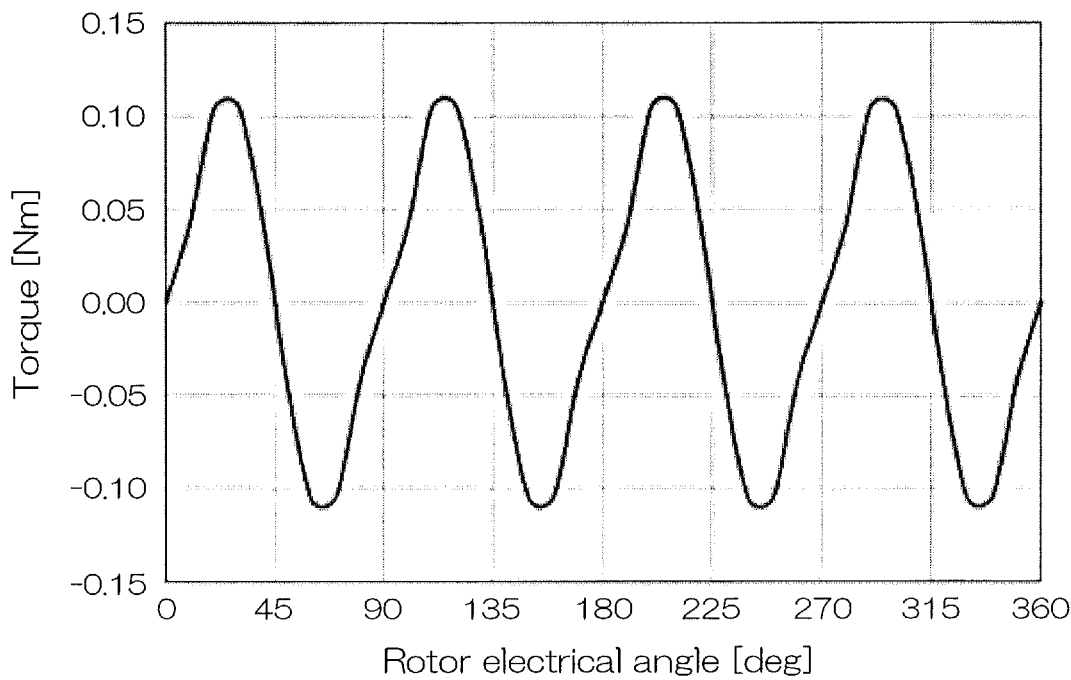

FIG. 21A shows the results of the analysis of the self-inductance L and the mutual inductance M obtained when the rotor was slowly rotated in a non-excitation state in the slot magnet type motor having a gap ratio ΔM/ΔF of 4. FIG. 21B shows the results of the analysis of the self-inductance L and the mutual inductance M obtained when the rotor was slowly rotated with a d-axis current set at a rated current value and with a q-axis current set at zero in the same motor. FIG. 22A shows the result of the torque analysis corresponding to FIG. 20A (in the non-excitation state). Further, FIG. 22B shows the result of the torque analysis corresponding to FIG. 20B (in the d-axis excitation with the rated current value). The torque in the non-excitation state (FIG. 22A) is a detent torque.

FIGS. 21A and 21B indicate that the self-inductance L and the mutual inductance M each have 2θ-angle dependence for each electrical angle and, particularly, the amplitude of the mutual inductance M is greater in the d-axis excitation with the rated current than in the non-excitation. The angle-differentiated values of the inductances L, M are proportional to the reluctance torque. Where the inductances L, M are each regarded to have a sinusoidal waveform, however, the amplitudes of the inductances L, M are substantially equal to the amplitudes of the angle-differentiated values of the inductances L, M. That is, it may be considered that the amplitudes of the inductances affect the reluctance torque. Therefore, the amplitude of the self-inductance L and the amplitude of the mutual inductance M are used as LΔ and MΔ, respectively, in the expression (6). FIG. 22B indicates that torque ripples occur during the excitation with the rated current. This means that the torque is not zero at an ideal stable point in FIGS. 20A and 20B and acts as the vibrating force.

Figure 23A:
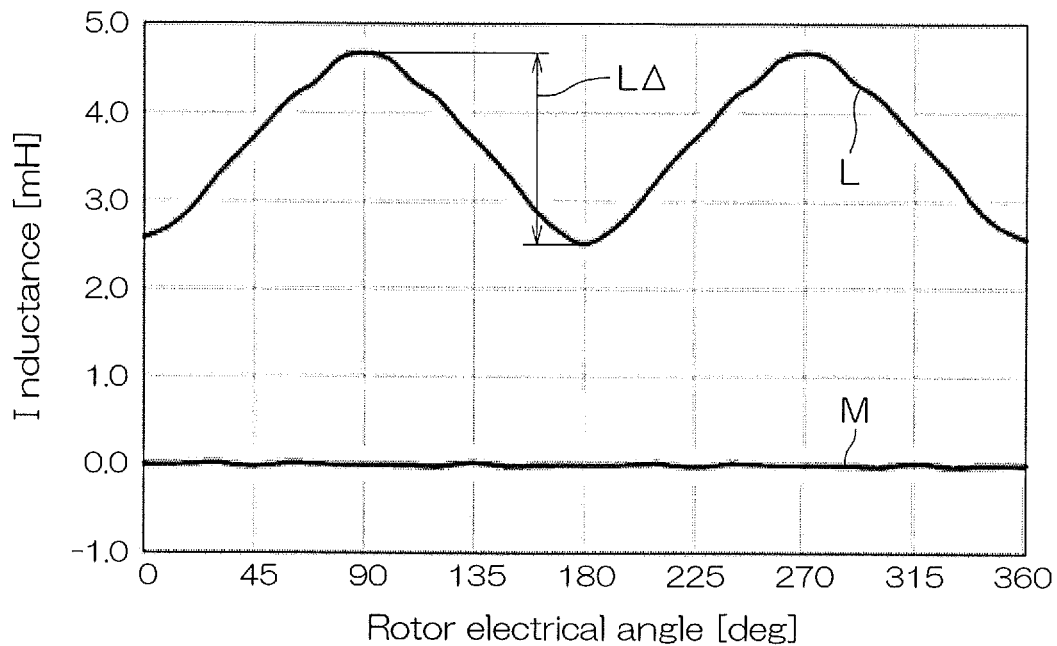
FIGS. 23A and 23B are diagrams showing the results of the analysis of the self-inductance and the mutual inductance of the slot magnet type stepping motor having a gap ratio of 8.
Figure 23B:
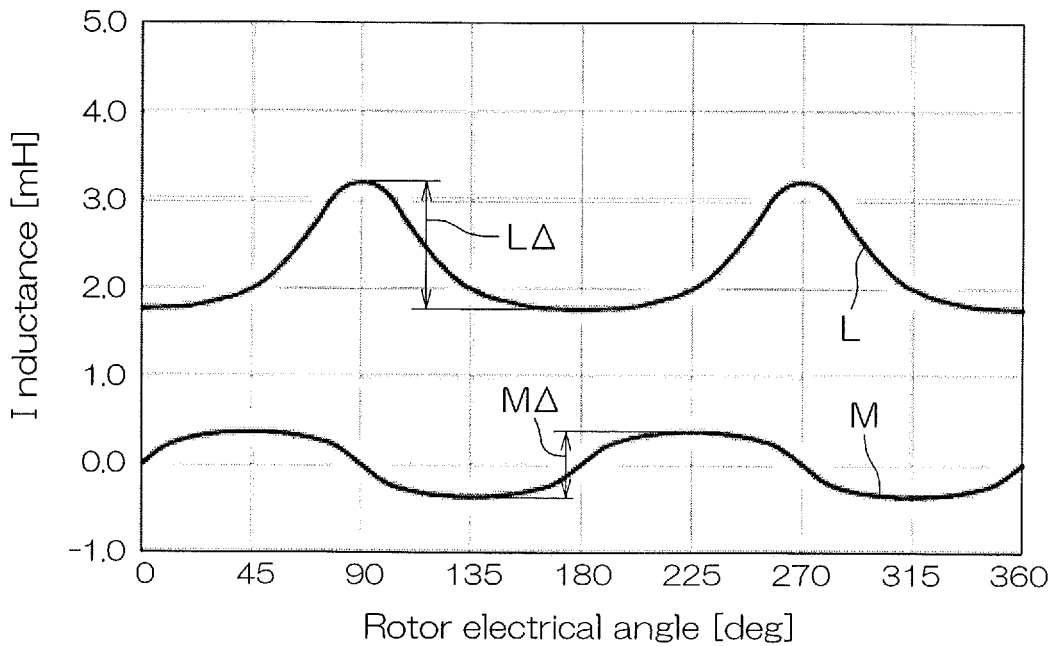
Figure 24A:
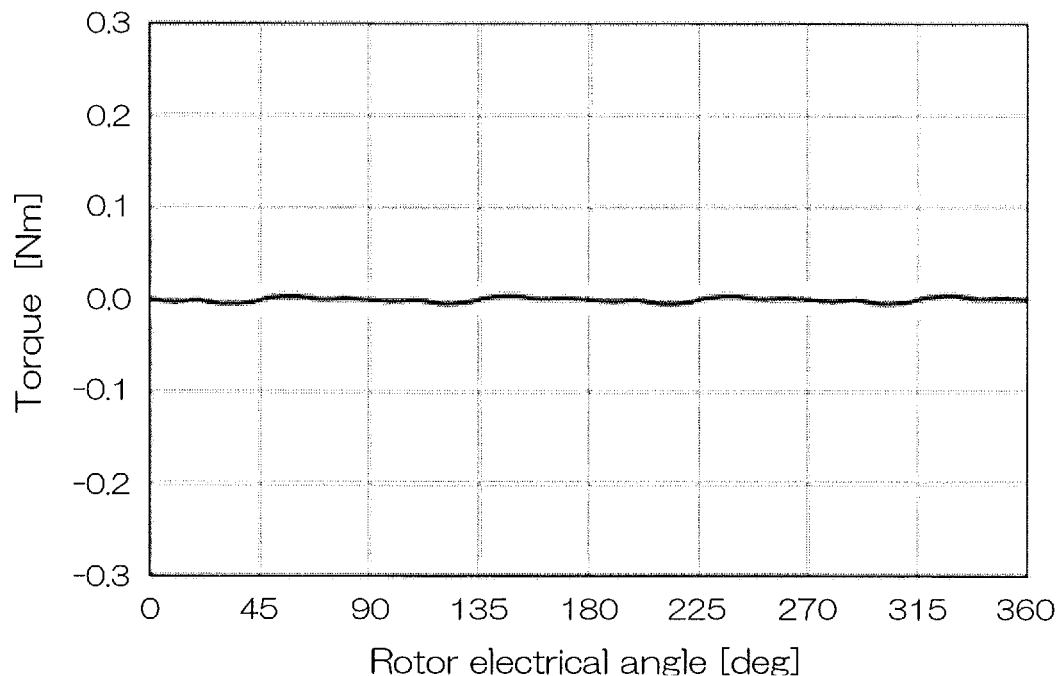
FIGS. 24A and 24B are diagrams showing the results of the torque analysis of the slot magnet type stepping motor having a gap ratio of 8.
Figure 24B:
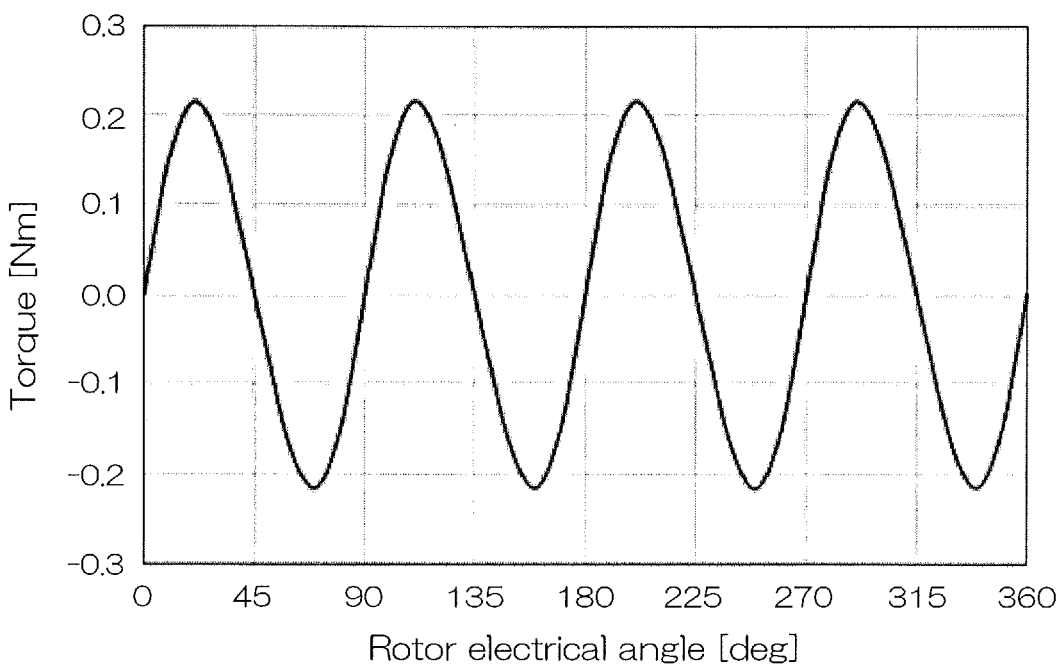

FIG. 23A shows the results of the analysis of the self-inductance L and the mutual inductance M obtained when the rotor of the slot magnet type motor having a gap ratio ΔM/ΔF of 8 was slowly rotated in the non-excitation state. FIG. 23B shows the results of the analysis of the self-inductance L and the mutual inductance M obtained when the rotor of the same motor was slowly rotated with the d-axis current set at the rated current value and with the q-axis current set at zero. FIG. 24A shows the result of the analysis of the torque corresponding to FIG. 23A (in the non-excitation state). FIG. 24B shows the result of the analysis of the torque corresponding to FIG. 23B (in the d-axis excitation with the rated current). The torque observed in the non-excitation state (FIG. 24A) is the detent torque.

As shown, the ratio between the self-inductance L and the mutual inductance M in the non-excitation state is significantly different as compared with the slot magnet type motor having a gap ratio $\Delta M/\Delta F$ of 4. As compared with the motor having a gap ratio $\Delta M/\Delta F$ of 4, the detent torque is smaller, but the torque ripples during the excitation are approximately doubled. This implies that the motor having a gap ratio $\Delta M/\Delta F$ of 8 suffers from greater vibrations when being driven with an ideal sinusoidal current. This also implies that the detent torque does not directly affect the rotational vibrations.

Figure 25:
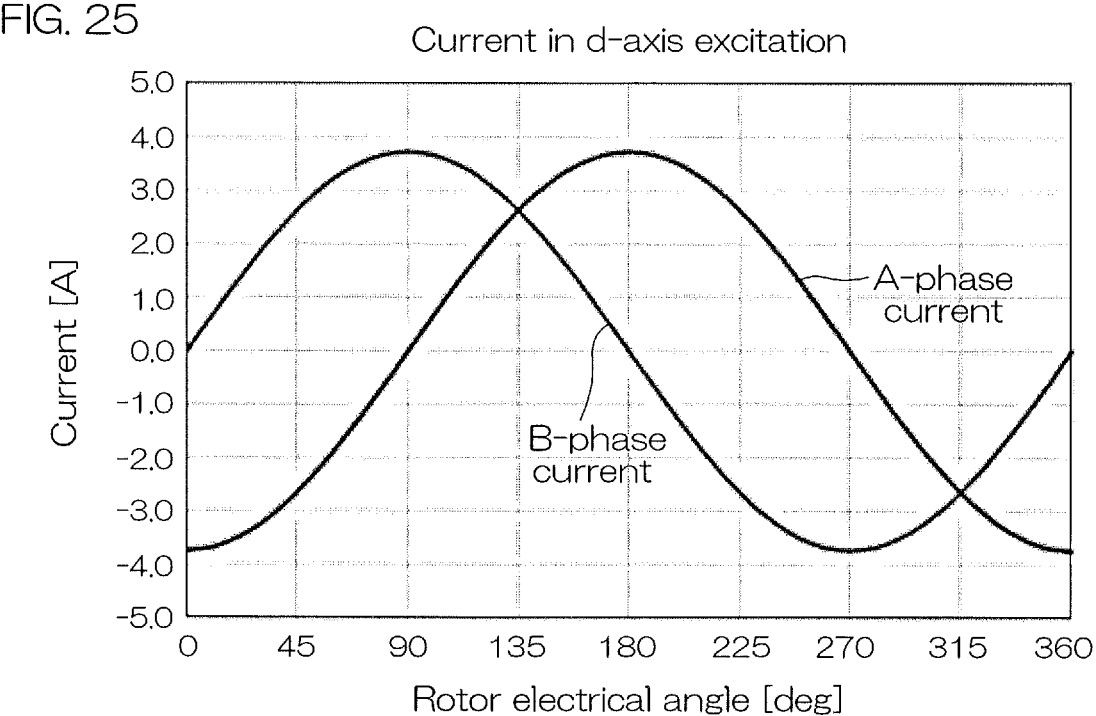
FIG. 25 is a waveform diagram showing exemplary waveforms of an A-phase sinusoidal current and a B-phase sinusoidal current applied during d-axis excitation with a rated current.
Figure 26:
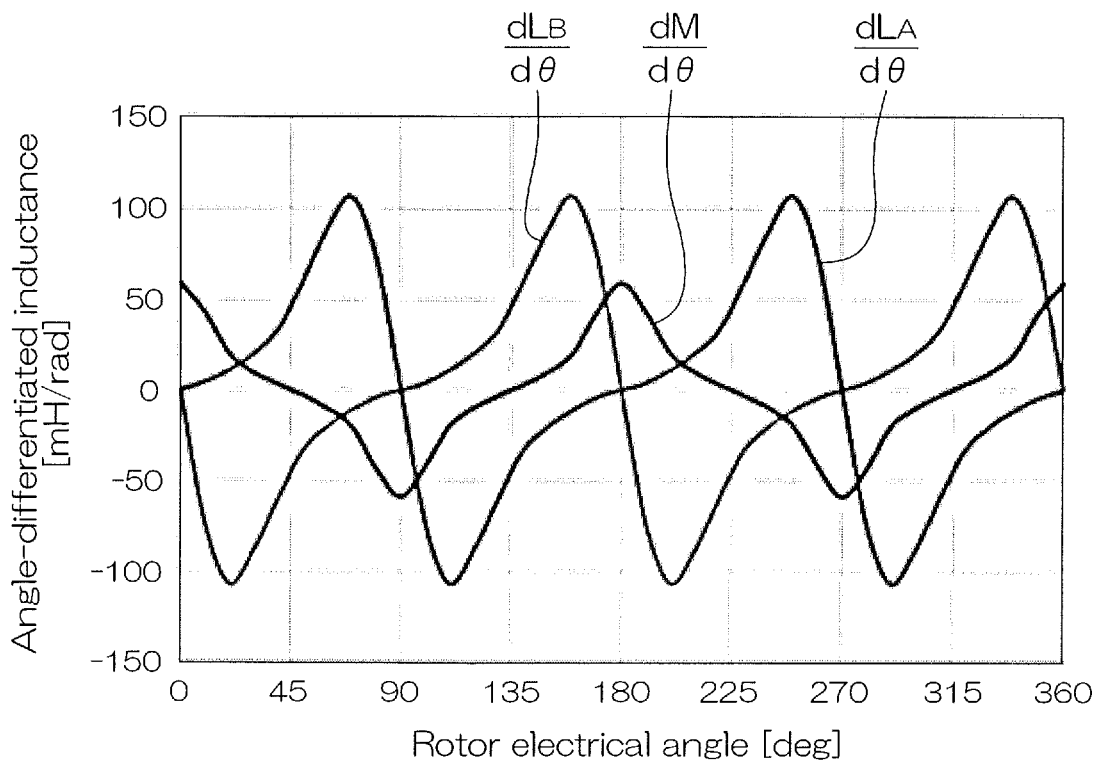
FIG. 26 is a waveform diagram showing the angle-differentiated inductance value calculated based on the results of the inductance analysis of the slot magnet type stepping motor.
Figure 27:
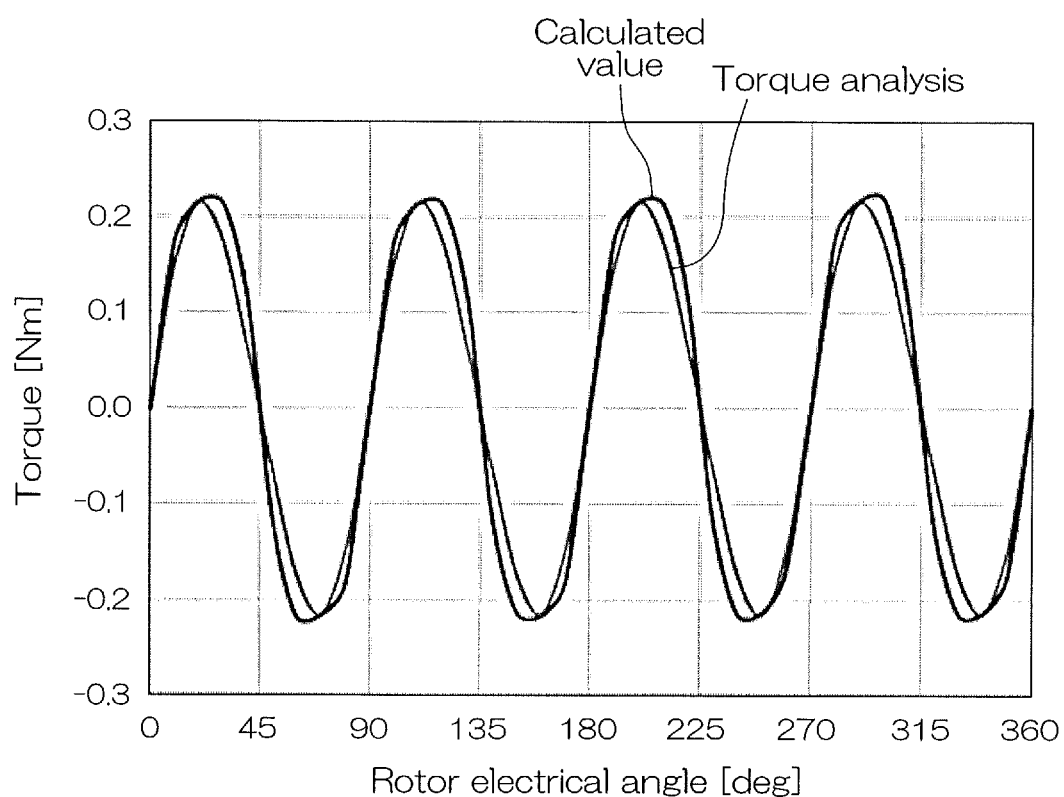
FIG. 27 is a waveform diagram showing superposed θ-T waveforms of reluctance torques respectively determined by calculation and analysis on the slot magnet type stepping motor.

The A-phase sinusoidal current and the B-phase sinusoidal current applied during the d-axis excitation with the rated current are as shown in FIG. 25. The angle-differentiated values are determined from the results (FIG. 23B) of the analysis of the inductances of the slot magnet type motor having a gap ratio $\Delta M/\Delta F$ of 8. Then, the angle-differentiated value $dL_A/d\theta$ of the A-phase self-inductance $L_A$, the angle-differentiated value $dL_B/d\theta$ of the B-phase self-inductance $L_B$, and the angle-differentiated value $dM/d\theta$ of the mutual inductance M are provided as shown in FIG. 26. Based on these, the reluctance torque $T_r$ is calculated from the expression (4), and is compared with the result of the torque analysis (FIG. 24B). The comparison result is shown in FIG. 27. As shown, the values calculated from the expression (4) (including absolute values) substantially match with the torque analysis result. This indicates that is attributable to the the torque ripple component reluctance torque.

In reality, as shown in FIG. 23B, the inductances L, M each have a waveform containing a certain harmonic component, depending on the motor. In the case of FIG. 23B, the self-inductance L has a waveform containing a harmonic component having a cycle twice that of the self-inductance L, and the mutual inductance M has a waveform containing a harmonic component having a cycle three times that of the mutual inductance M. With these harmonic components, the angle-differentiated waveforms of the inductances L, M are also deviated from the sinusoidal waveforms. In the expressions (17) and (18), therefore, the amplitudes $L\Delta$, $M\Delta$ of the angle-differentiated inductances (i.e., coefficients $A_1$, $A_2$) and $\delta_1$, $\delta_2$ of the harmonic current phase components are desirably effectively changed depending on how the harmonic components are contained in the inductances. More specifically, the vibration suppressing effect can be often improved by matching the phase of the reluctance torque correction waveform with the fundamental sinusoidal wave while allowing a slight phase deviation rather than by perfectly matching the phase of the reluctance torque correction waveform with the fundamental sinusoidal wave.

The same electrical configuration as shown in FIGS. 13 and 14 for driving the hybrid type stepping motor is used for driving the slot magnet type stepping motor. In the slot magnet type stepping motor, the vibrations can be suppressed by the current correction for the reluctance torque and the current correction for the nonlinearity term of the magnet torque as in the hybrid type stepping motor. However, the current correction for the nonlinearity term of the magnet torque is less necessary than in the hybrid type stepping motor and, therefore, may be obviated.

Figure 28:
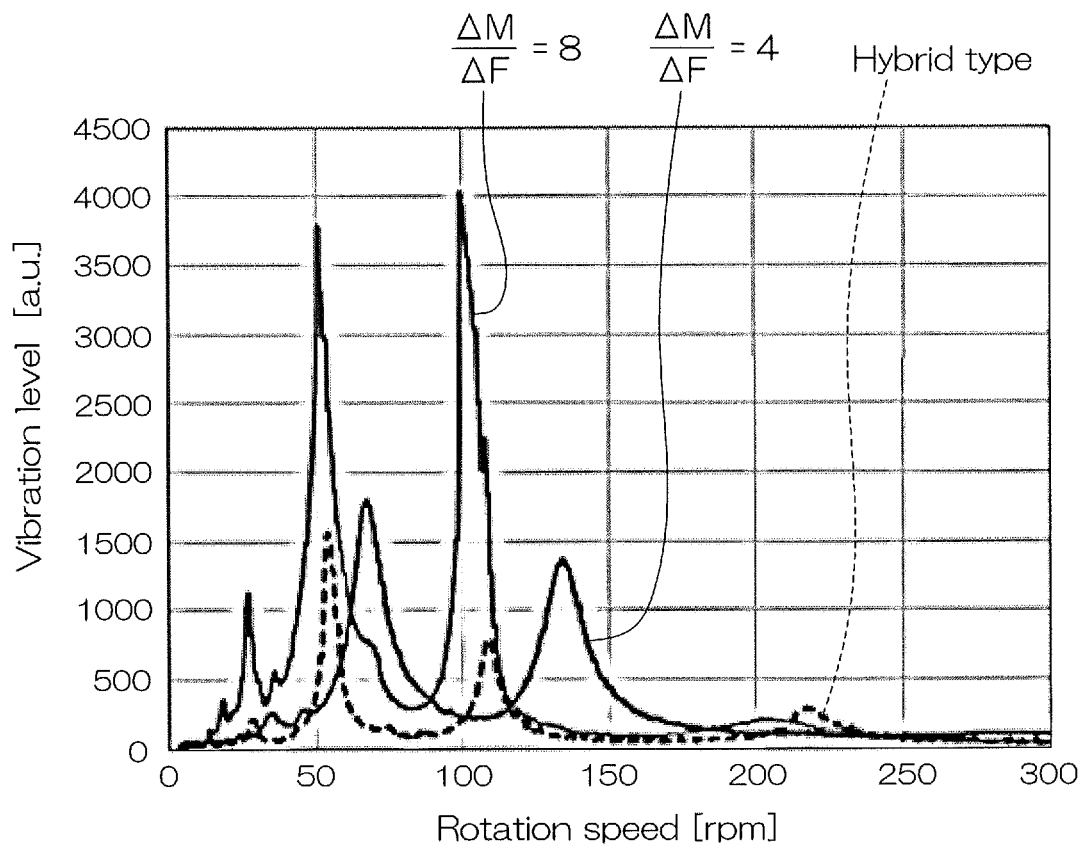
FIG. 28 is a diagram showing the measurement of the rotational vibrations of the slot magnet type stepping motor (without correction) by way of example.
Figure 29:
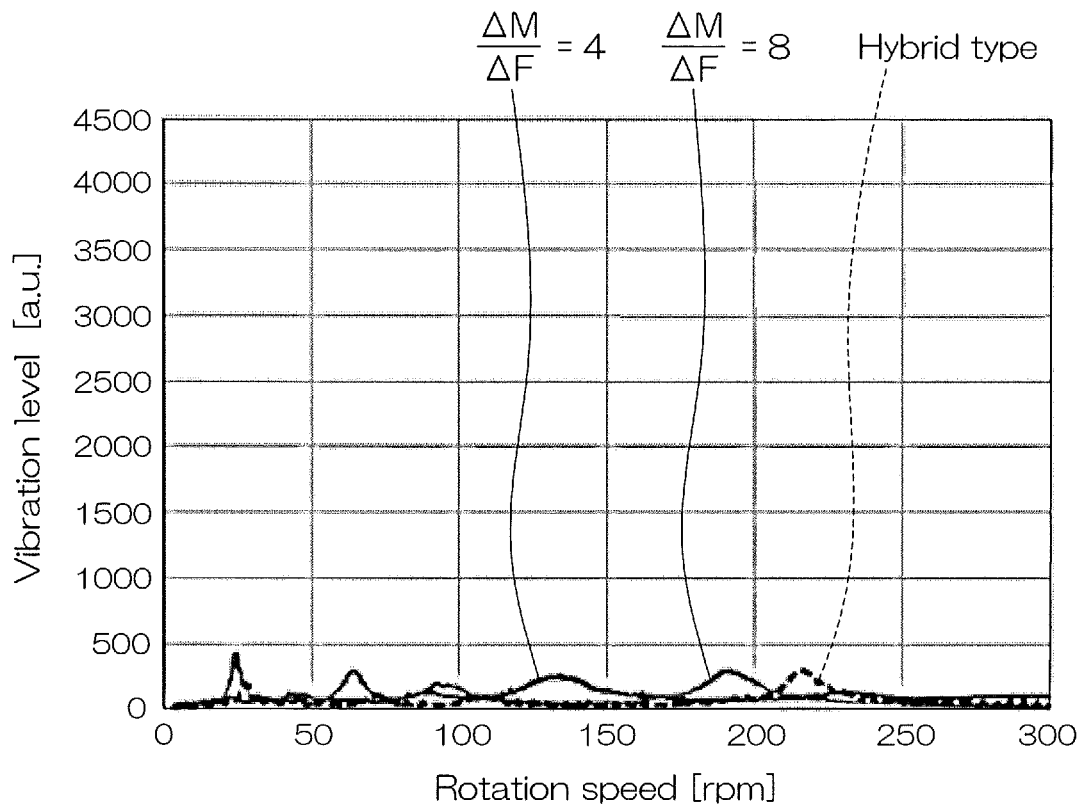
FIG. 29 is a diagram showing the measurement of the rotational vibrations of the slot magnet type stepping motor (with current correction) by way of example.

Exemplary measurements of the rotational vibrations are shown in FIGS. 28 and 29. Stepping motors 1 used for the measurements include two-phase slot magnet type stepping motors (see FIGS. 18 and 19) each having a mounting angle size of 60 mm, a motor length of 40 mm, a rotor inertia moment of $370 \times 10^{-7}$ kg·m$^2$, and a rotor tooth number of 50, and a hybrid type stepping motor (see FIGS. 10 to 12) having the same physical construction. The two-phase slot magnet type stepping motors have a gap ratio $\Delta M/\Delta F$ of 4 and a gap ratio $\Delta M/\Delta F$ of 8, respectively, for which the measurement results are shown.

FIG. 28 shows a relationship between the rotation speed and the rotational vibration level where neither the current correction for the reluctance torque nor the current correction for the magnet torque was performed (where the motors were each driven with an uncorrected sinusoidal current). FIG. 29 shows a relationship between the rotation speed and the rotational vibration level where the current correction for the reluctance torque was performed and the current correction for the magnet torque was obviated.

Figure 30:
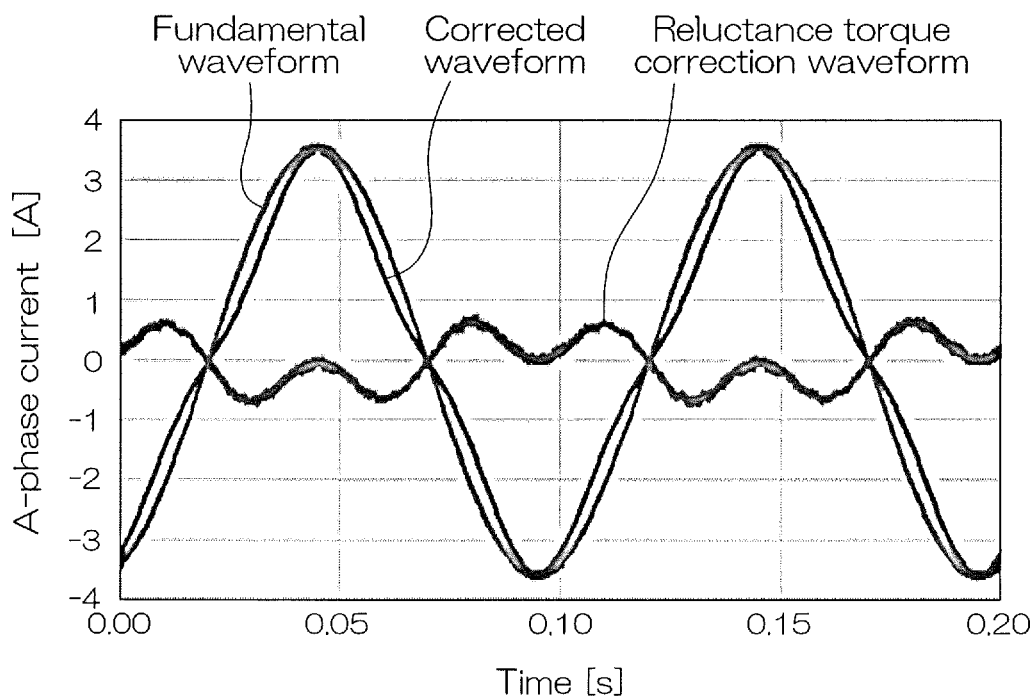
FIG. 30 is a waveform diagram showing the actual measurement values of the motor current of the slot magnet type stepping motor.

FIG. 30 shows actual measurement values of the motor current of the slot magnet type stepping motor having a gap ratio $\Delta M/\Delta F$ of 8. Shown in FIG. 30 are a fundamental current waveform yet to be corrected (a sinusoidal waveform corresponding to the line 510, 520 in FIG. 5A, 5B), a reluctance torque correction current waveform (corresponding to the line 511, 521 in FIG. 5A, 5B) to be superposed on the fundamental current waveform, and a corrected current waveform (corresponding to the line 512, 522 in FIG. 5A, 5B). The corrected current waveform is a waveform obtained by superposing the reluctance torque correction current waveform on the fundamental current waveform. However, the amplitude of the reluctance torque correction current waveform is adjusted according to the motor current before the superposition.

Where the slot magnet type stepping motors respectively having a gap ratio $\Delta M/\Delta F$ of 4 and a gap ratio $\Delta M/\Delta F$ of 8 and the hybrid type stepping motor were driven with the uncorrected sinusoidal current (FIG. 28), the second-order and fourth-order rotational vibrations notably appeared. On the other hand, where the current corrections were performed (FIG. 29), the vibration levels of the respective motors were significantly reduced.

FIGS. 31A and 31B show the results of the measurement of the stop angle error when the slot magnet type motor having a gap ratio $\Delta M/\Delta F$ of 4 was operated by the full-step driving (1.8 degrees/pulse). The measurement results shown in FIG. 31A were obtained with the stop current set at the rated current, and the measurement results shown in FIG. 31B were obtained with the stop current set at 50% of the rated current. Shown in each of FIGS. 31A and 31B are measurement results obtained with and without the current correction for the reluctance torque. It is conventionally considered that the stop angle error observed when the motor is operated by the full-step driving is determined by the mechanical accuracy of the small teeth. However, this is not true when the reluctance torque is taken into consideration, but the stop angle error during the full-step driving can be suppressed by the current correction. FIGS. 31A and 31B indicate that, even if the different stop currents are employed, the current correction provides substantially the same stop angle error suppressing effect.

Figure 32A:
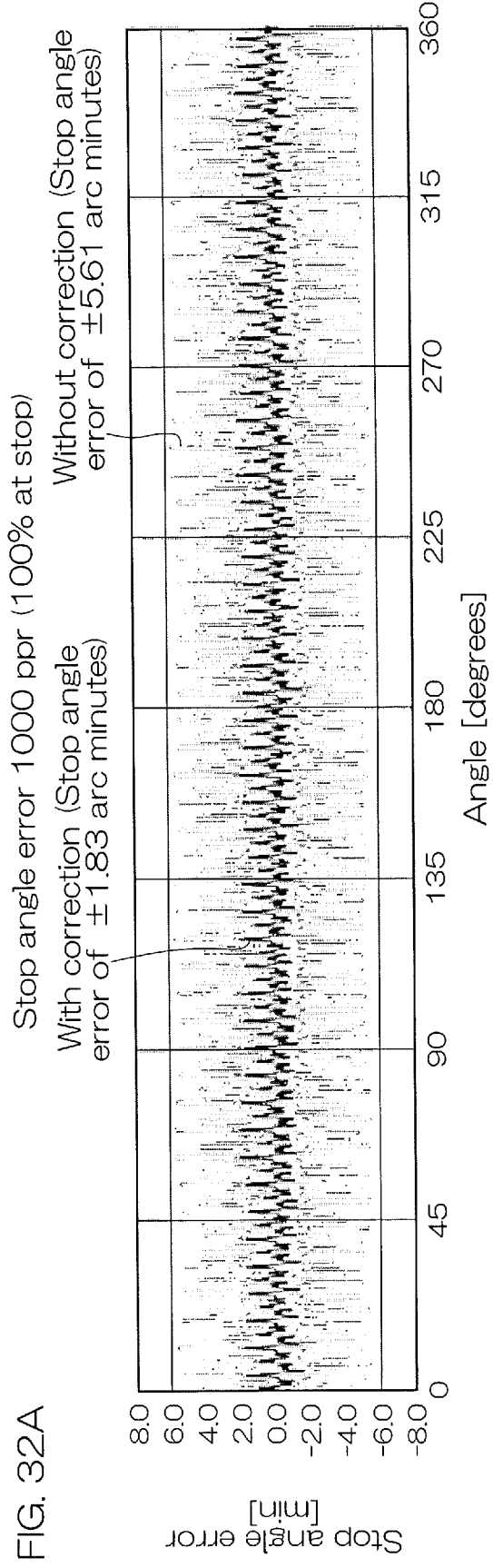
FIGS. 32A and 32B are diagrams showing the results of the measurement of the stop angle error when the slot magnet type stepping motor was operated by micro-step driving.
Figure 32B:
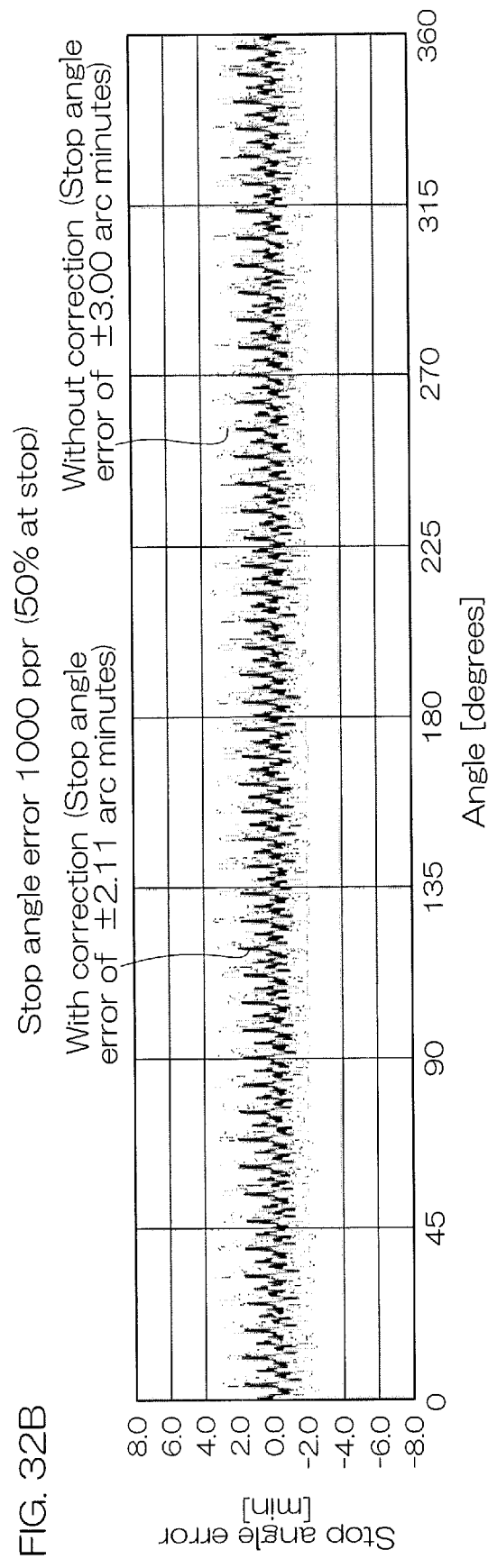

FIGS. 32A and 32B show the results of the measurement of the stop angle error when the slot magnet type stepping motor was operated by the micro-step driving (0.36 degrees/ pulse). The measurement results shown in FIG. 32A were obtained with the stop current set at the rated current, and the measurement results shown in FIG. 32B were obtained with the stop current set at 50% of the rated current. Shown in each of FIGS. 32A and 32B are measurement results obtained with and without the current correction for the reluctance torque. The measurement results indicate that, even in the case of the micro-step driving, the current correction is effective and, even if the different stop currents are employed, the stop angle error suppressing effect can be maintained.

While the embodiment of the present invention has thus been described, the present invention may be embodied in some other ways. Although the embodiment described above is mainly directed to the stepping motor by way of example, the present invention is applicable to other two-phase synchronous motors such as surface magnet type motors and embedded magnet type motors.

In the embodiment described above, the current correction for the fluctuation of the reluctance torque and the current correction for the nonlinearity of the magnet torque have been mainly described by way of example, but the vibration suppressing effect can be provided even without the current correction for the nonlinearity of the magnet torque. Further, the vibration suppressing effect can be achieved to a certain extent by employing only the current correction for the nonlinearity of the magnet torque without the current correction for the fluctuation of the reluctance torque.

Besides, various design modifications may be made within the scope of the present invention defined by the appended claims.

Features of the correction for the nonlinearity of the magnet torque, which are abstracted from the description of the present invention and the attached drawings, will be described below:

(1) A motor control device for driving a two-phase synchronous motor, which includes: control current waveform generating means which generates a control current waveform by superposing a fundamental sinusoidal wave and a magnet torque correction waveform for compensation for the nonlinearity of the magnet torque of the two-phase synchronous motor with respect to a current; and current control signal generating means which generates a current control signal for supplying the current to the windings of the two-phase synchronous motor according to the control current waveform generated by the control current waveform generating means.

(2) In the motor control device of the item (1), the magnet torque correction waveform is a waveform which varies according to the motor current supplied to the two-phase synchronous motor.

(3) In the motor control device of the item (1) or (2), the magnet torque correction waveform has a waveform profile that amplifies the amplitude of a peak portion of the fundamental sinusoidal wave when being superposed on the fundamental sinusoidal wave.

(4) In the motor control device of any one of the items (1) to (3), the two-phase synchronous motor is a stepping motor.

(5) In the motor control device of the item (4), the stepping motor is of a hybrid type or of a slot magnet type.

While the embodiments of the present invention have been described in detail, these embodiments are merely specific examples that are illustrative of the technical principles of the present invention but not limitative of the invention. The spirit and scope of the present invention are limited only by the appended claims.

This application claims the priority benefit of Japanese Patent Application No. 2020-082561 filed on May 8, 2020, the disclosure of which is entirely incorporated herein by reference.

REFERENCE SIGNS LIST

1: Stepping motor
2: Stator
3: Rotor
21: Stator iron core
22: Windings
23: Stator teeth
24: Stator slots
25: Stator slot magnets
28: Main poles
29: Wiring slots
30: Rotation axis
31: Rotor iron core
33: Rotor teeth
34: Rotor slots
35: Rotor slot magnets
40: Permanent magnet
41: Rotor segment
42: Rotor segment
50: DC power source
51: PWM inverter
512: Pulse width modulation pattern generator
52: Current detectors
55: Driving circuit section
60: Control device
70: Fundamental sinusoidal wave generator
71: Reluctance torque correction waveform generator
72: Magnet torque correction waveform generator
73: Coefficient setting device
76: First adder
77: Second adder
78: Current feedback controller
Hr: Rotor tooth height
MTr: Rotor magnet thickness
Hs: Stator tooth height
MTs: Stator magnet thickness
$\Delta F$: Iron gap
$\Delta M$: Magnet gap

The invention claimed is:

1. A motor control device to drive a two-phase synchronous motor, the motor control device comprising:
a control current waveform generator which generates a control current waveform by superposing a fundamental sinusoidal wave and a reluctance torque correction waveform that suppresses fluctuation of a reluctance torque of the two-phase synchronous motor; and
a current control signal generator which generates a current control signal to supply a current to windings of the two-phase synchronous motor according to the control current waveform generated by the control current waveform generator, wherein
the reluctance torque correction waveform has such a waveform profile that is obtained by full-wave-rectifying an original waveform, which has a frequency twice that of the fundamental sinusoidal wave and has a phase matched with that of the fundamental sinusoidal wave, to the same sign as or a different sign from that of the fundamental sinusoidal wave.

2. The motor control device according to claim 1, wherein the original waveform is a sinusoidal waveform.

3. The motor control device according to claim 1, wherein the reluctance torque correction waveform has a waveform profile such that the original waveform is full-wave-rectified to the same sign as that of the fundamental sinusoidal wave when an amplitude of an angle-differentiated self-inductance of the two-phase synchronous motor is greater than an amplitude of an angle-differentiated mutual inductance of the two-phase synchronous motor, and the reluctance torque correction waveform has a waveform profile such that the original waveform is full-wave-rectified to the different sign from that of the fundamental sinusoidal wave when the amplitude of the angle-differentiated self-inductance of the two-phase synchronous motor is smaller than the amplitude of the angle-differentiated mutual inductance of the two-phase synchronous motor.

4. The motor control device according to claim 1, wherein the reluctance torque correction waveform is a waveform generated by calculation using a ratio between an amplitude of an angle-differentiated self-inductance and an amplitude of an angle-differentiated mutual inductance of the two-phase synchronous motor.

5. The motor control device according to claim 1, wherein the reluctance torque correction waveform is a waveform which varies according to a motor current supplied to the two-phase synchronous motor.

6. The motor control device according to claim 1, wherein the two-phase synchronous motor is a stepping motor.

7. The motor control device according to claim 6, wherein the stepping motor is of a hybrid type or of a slot magnet type.

8. The motor control device according to claim 1, wherein the control current waveform has a waveform profile generated by superposing the fundamental sinusoidal wave, the reluctance torque correction waveform, and a magnet torque correction waveform for compensation for nonlinearity of a magnet torque with respect to the current.

9. The motor control device according to claim 8, wherein the magnet torque correction waveform is a waveform which varies according to the motor current supplied to the two-phase synchronous motor.

10. The motor control device according to claim 8, wherein the magnet torque correction waveform has a waveform profile that amplifies an amplitude of a peak portion of the fundamental sinusoidal wave when being superposed on the fundamental sinusoidal wave.

11. A motor control device to drive a two-phase synchronous motor, the motor control device comprising:
   a control current waveform generator which generates a control current waveform by superposing a fundamental sinusoidal wave and a magnet torque correction waveform for compensation for a nonlinearity of a magnet torque of the two-phase synchronous motor with respect to a current; and
   a current control signal generator which generates a current control signal to supply the current to windings of the two-phase synchronous motor according to the control current waveform generated by the control current waveform generator, wherein
   the magnet torque correction waveform has a waveform profile that amplifies an amplitude of a peak portion of the fundamental sinusoidal wave when being superposed on the fundamental sinusoidal wave.

12. The motor control device according to claim 11, wherein the magnet torque correction waveform is a waveform which varies according to a motor current supplied to the two-phase synchronous motor.

13. The motor control device according to claim 11, wherein the two-phase synchronous motor is a stepping motor.

14. The motor control device according to claim 13, wherein the stepping motor is of a hybrid type or of a slot magnet type.

* * * * *